US012218831B2

(12) United States Patent
Nallamothu et al.

(10) Patent No.: US 12,218,831 B2
(45) Date of Patent: Feb. 4, 2025

(54) CONTAINERIZED ROUTING PROTOCOL PROCESS FOR VIRTUAL PRIVATE NETWORKS

(71) Applicant: Juniper Networks, Inc., Sunnyvale, CA (US)

(72) Inventors: Vinay K Nallamothu, Sunnyvale, CA (US); Arijit Paul, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/807,700

(22) Filed: Jun. 17, 2022

(65) Prior Publication Data

US 2023/0079209 A1     Mar. 16, 2023

Related U.S. Application Data

(60) Provisional application No. 63/242,434, filed on Sep. 9, 2021.

(51) Int. Cl.
*H04L 45/42*     (2022.01)
*H04L 12/46*     (2006.01)
*H04L 45/745*     (2022.01)
*H04L 45/76*     (2022.01)

(52) U.S. Cl.
CPC .......... *H04L 45/42* (2013.01); *H04L 12/4641* (2013.01); *H04L 45/745* (2013.01); *H04L 45/76* (2022.05)

(58) Field of Classification Search
CPC ..... H04L 45/42; H04L 45/76; H04L 12/4641; H04L 45/745
See application file for complete search history.

(56) References Cited

U.S. PATENT DOCUMENTS 9,571,394 B1    2/2017   Sivaramakrishnan et al.
9,942,148 B1 *   4/2018   Sivaramakrishnan .. H04L 47/31
10,142,226 B1   11/2018   Wu et al.
(Continued)

FOREIGN PATENT DOCUMENTS

WO     2013184846 A1    12/2013
WO     2016168577 A1    10/2016

OTHER PUBLICATIONS

Extended Search Report from counterpart European Application No. 22194259.2 dated Jan. 24, 2023, 11 pp.
(Continued)

*Primary Examiner* — Oleg Survillo
*Assistant Examiner* — Monishwar Mohan
(74) *Attorney, Agent, or Firm* — Shumaker & Sieffert, P.A.

(57) ABSTRACT

In general, this disclosure describes techniques for leveraging a containerized routing protocol process to implement virtual private networks using routing protocols. In an example, a system comprises a container orchestration system for a cluster of computing devices, the cluster of computing devices including a computing device, wherein the container orchestration system is configured to: deploy a containerized application to a compute node; and in response to deploying the containerized application to the compute node, configure in the compute node a virtual routing and forwarding (VRF) instance to implement a virtual private network (VPN) for the containerized application.

20 Claims, 10 Drawing Sheets

(56) References Cited

U.S. PATENT DOCUMENTS

| | | | |
|---|---|---|---|
| 10,728,145 | B2 | 7/2020 | Rao et al. |
| 10,944,691 | B1* | 3/2021 | Raut ................... H04L 45/64 |
| 10,965,497 | B1 | 3/2021 | Tregenza Dancer |
| 11,070,469 | B1* | 7/2021 | Vairavakkalai ..... H04L 61/2571 |
| 2015/0092780 | A1* | 4/2015 | Li ........................ H04L 45/04 370/392 |
| 2017/0093702 | A1* | 3/2017 | Teng ................... H04L 12/4633 |
| 2018/0006935 | A1* | 1/2018 | Mutnuru ............... H04L 45/42 |
| 2018/0357086 | A1 | 12/2018 | Kinsella et al. |
| 2018/0375763 | A1* | 12/2018 | Brissette ............... H04L 67/63 |
| 2020/0073692 | A1* | 3/2020 | Rao ..................... H04L 12/4633 |
| 2020/0112487 | A1 | 4/2020 | Inamdar et al. |
| 2020/0278892 | A1 | 9/2020 | Nainar et al. |
| 2020/0322143 | A1 | 10/2020 | Voit et al. |
| 2020/0374186 | A1 | 11/2020 | Scott |
| 2021/0019194 | A1 | 1/2021 | Bahl et al. |
| 2021/0297347 | A1* | 9/2021 | Xu ........................ H04L 49/70 |
| 2022/0158926 | A1 | 5/2022 | Wennerstrom et al. |
| 2022/0231948 | A1 | 7/2022 | Zheng |

OTHER PUBLICATIONS

Juniper Networks, "Junos Containerized Routing Protocol Daemon", Juniper Networks, Inc., Nov. 2020, 3 pp., URL: https://www.juniper.net/content/dam/www/assets/datasheets/US/en/network-operating-system/junos-containerized-routing-protocol-daemon-datasheet.pdf.

Wikipedia, "Routing", Jul. 2021, 9 pp., Retrieved from the Internet on Jan. 9, 2021 from URL: https://en.wikipedia.org/w/index.php?title=Routing&oldid=1033686152.

Ali et al., "Operations, Administration, and Maintenance (OAM) in Segment Routing Networks with IPv6 Data plane (SRv6)," draft-ietf-6man-spring-srv6-oam-13, Jan. 23, 2022, pp. 1-24, https://datatracker.ietf.org/doc/html/draft-ietf-6man-spring-srv6-oam.

Askari et al., "Exploiting DPDK in Containerized Environment with Unsupported Hardware", 2020 IEEE Conference on Network Function Virtualization and Software Defined Networks (NFV-SDN), IEEE, Nov. 10, 2020, pp. 7-12.

Dawra et al., "SRv6 BGP based Overlay Services," draft-ietf-bess-srv6-services-15, Mar. 22, 2022, pp. 1-34, https://datatracker.ietf.org/doc/html/draft-ietf-bess-srv6-services.

Filsfils et al., "Network Programming extension: SRv6 uSID instruction," draft-filsfils-spring-net-pgm-extension-srv6-usid-13, Jun. 13, 2022, 23 pp., https://datatracker.ietf.org/doc/draft-filsfils-spring-net-pgm-extension-srv6-usid/.

Gupta, "Juniper Cloud-Native Routing—Optimize Your Peering Traffic", Juniper Networks, Inc., Oct. 21, 2020, pp. 1-3, https://blogs.juniper.net/en-us/service-provider-transformation/juniper-cloud-native-routing-optimize-your-peering-traffic.

Juniper Networks, Inc, "O-Ran Alliance—Virtual Exhibition", Jun. 6, 2021, 2 pp., https://www.virtualexhibition.o-ran.org/classic/generation/2021/category/intelligent-ran-control-demonstrations/sub/intelligent-control/94.

Juniper Networks, Inc, "Simplifying Operability & Manageability with Cloud-Native Routing", Nov. 17, 2021, 2 pp., https://www.juniper.net/us/en/the-feed/topics/5g/get-connected-podcast-episode-2-simplifying-operability-and-manageability-with-cloud-native-routing-podcast.html.

Juniper Networks, Inc., "Layer 3 VPNs User Guide for Routing Devices", Junos OS, Jun. 15, 2022, 1542 pp.

Kn et al., "Day One: Contrail DPDK vRouter", Juniper Networks, Engineering Simplicity, Jan. 2021, 196 pp.

Kokot, "Cloud-Native Routers: Transforming the Economics of Distributed Networks", Juniper Networks, Inc., Feb. 22, 2022, pp. 1-4, https://blogs.juniper.net/en-us/service-provider-transformation/cloud-native-routers-transforming-the-economics-of-distributed-networks.

Mali et al., "Day One: Cloud Native Routing With cRPD", Juniper Networks, Aug. 3, 2021, 93 pp.

Psenak et al., "IGP Flexible Algorithm," draft-ietf-lsr-flex-algo-20, May 18, 2022, pp. 1-47, https://datatracker.ietf.org/doc/html/draft-ietf-lsr-flex-algo.

Psenak et al., "IS-IS Extensions to Support Segment Routing over IPv6 Dataplane," draft-ietf-lsr-isis-srv6-extensions-18, Oct. 20, 2021, pp. 1-29, https://datatracker.ietf.org/doc/html/draft-ietf-lsr-isis-srv6-extensions.

Rosen et al., "BGP/MPLS IP Virtual Private Networks (VPNs)", Network Working Group, RFC4364, Feb. 2006, 47 pp.

Sajassi et al., "BGP MPLS-Based Ethernet VPN", Internet Engineering Task Force (IETF), RFC 7432, Feb. 2015, 55 pp.

U.S. Appl. No. 17/305,110, filed Jun. 30, 2021, naming inventors Nagaprakash et al.

U.S. Appl. No. 17/649,632, filed Feb. 1, 2022, naming inventors Akkipeddi et al.

U.S. Appl. No. 17/652,250, filed Feb. 23, 2022, naming inventors Mariappan et al.

Office Action from U.S. Appl. No. 17/649,632 dated Jun. 15, 2023, 14 pp.

Response to Extended Search Report dated Jan. 24, 2023, from counterpart European Application No. 22194259.2 filed Sep. 12, 2023, 22 pp.

Response to Office Action dated Jun. 23, 2023 from U.S. Appl. No. 17/649,632, filed Sep. 23, 2023, 12 pp.

Final Office Action from U.S. Appl. No. 17/649,632 dated Oct. 31, 2023, 15 pp.

Advisory Action from U.S. Appl. No. 17/649,632 dated Jan. 23, 2024, 3 pp.

Office Action from U.S. Appl. No. 17/649,632 dated Feb. 26, 2024, 13 pp.

Response to Final Office Action dated Oct. 31, 2024 from U.S. Appl. No. 17/649,632, filed Jan. 2, 2024, 13 pp.

Response to Office Action dated Feb. 26, 2024 from U.S. Appl. No. 17/649,632, filed May 28, 2024, 13 pp.

Notice of Allowance from U.S. Appl. No. 17/649,632 dated Jul. 18, 2024, 6 pp.

Communication pursuant to Article 94(3) EPC from counterpart European Application No. 22194259.2 dated Oct. 4, 2024, 6 pp.

Wikipedia, "SSL VPN", Wikipedia, May 24, 2017, 10 pp., Machine translation provided; URL: https://de.wikipedia.org/w/index.php?title=SSLVPN&oldid=165781840.

* cited by examiner

CONTAINERIZED ROUTING PROTOCOL PROCESS FOR VIRTUAL PRIVATE NETWORKS

This application claims the benefit of U.S. Provisional Patent Application No. 63/242,434, filed 9 Sep. 2021, the entire contents of which is incorporated herein by reference.

TECHNICAL FIELD

The disclosure relates to a virtualized computing infrastructure and, more specifically, to virtual private networking using a virtualized computing infrastructure.

BACKGROUND

In a typical cloud data center environment, there is a large collection of interconnected servers that provide computing and/or storage capacity to run various applications. For example, a data center may comprise a facility that hosts applications and services for subscribers, i.e., customers of data center. The data center may, for example, host all of the infrastructure equipment, such as networking and storage systems, redundant power supplies, and environmental controls. In a typical data center, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Virtualized data centers are becoming a core foundation of the modern information technology (IT) infrastructure. In particular, modern data centers have extensively utilized virtualized environments in which virtual hosts, also referred to herein as virtual execution elements, such virtual machines or containers, are deployed and executed on an underlying compute platform of physical computing devices.

Virtualization within a data center can provide several advantages. One advantage is that virtualization can provide significant improvements to efficiency. As the underlying physical computing devices (i.e., servers) have become increasingly powerful with the advent of multicore microprocessor architectures with a large number of cores per physical CPU, virtualization becomes easier and more efficient. A second advantage is that virtualization provides significant control over the computing infrastructure. As physical computing resources become fungible resources, such as in a cloud-based computing environment, provisioning and management of the computing infrastructure becomes easier. Thus, enterprise IT staff often prefer virtualized compute clusters in data centers for their management advantages in addition to the efficiency and increased return on investment (ROI) that virtualization provides.

Containerization is a virtualization scheme based on operation system-level virtualization. Containers are lightweight and portable execution elements for applications that are isolated from one another and from the host. Because containers are not tightly coupled to the host hardware computing environment, an application can be tied to a container image and executed as a single light-weight package on any host or virtual host that supports the underlying container architecture. As such, containers address the problem of how to make software work in different computing environments. Containers offer the promise of running consistently from one computing environment to another, virtual or physical.

With containers' inherently lightweight nature, a single host can often support many more container instances than traditional virtual machines (VMs). Often short-lived, containers can be created and moved more efficiently than VMs, and they can also be managed as groups of logically related elements (sometimes referred to as "pods" for some orchestration platforms, e.g., Kubernetes). These container characteristics impact the requirements for container networking solutions: the network should be agile and scalable. VMs, containers, and bare metal servers may need to coexist in the same computing environment, with communication enabled among the diverse deployments of applications. The container network should also be agnostic to work with the multiple types of orchestration platforms that are used to deploy containerized applications.

A computing infrastructure that manages deployment and infrastructure for application execution may involve two main roles: (1) orchestration—for automating deployment, scaling, and operations of applications across clusters of hosts and providing computing infrastructure, which may include container-centric computing infrastructure; and (2) network management—for creating virtual networks in the network infrastructure to enable packetized communication among applications running on virtual execution environments, such as containers or VMs, as well as among applications running on legacy (e.g., physical) environments. Software-defined networking contributes to network management.

SUMMARY

In general, this disclosure describes techniques for leveraging a containerized routing protocol process to implement virtual private networks using routing protocols. A container network interface plugin (CNI) is a networking solution for application containers and is a runtime executable that assists with configuring interfaces between containers and other components of the computing device ("host") hosting the container. The computing device may be alternatively referred to as a "compute node" or "server". The CNI typically creates the network interface, assigns the network address (e.g., IP address) to the network interface, and may also add routes relevant for the network interface, such as routes for the default gateway and one or more nameservers.

In an example of the described techniques, a containerized routing protocol daemon (cRPD) is a containerized routing protocol process that is packaged as a container to run in, e.g., Linux-based environments. cRPD may be executed in the user space of the host as a containerized process. Thus, cRPD makes available the rich routing software pedigree of physical routers on Linux-based compute nodes. cRPD provides control plane functionality. Existing implementations of cRPD (running on the host) use the forwarding provided by the Linux kernel. This control plane is thus containerized. A virtual router is the software entity that provides data plane functionality on the compute node. The compute node may be hosting VMs or containers centrally orchestrated and provisioned. The virtual router may work with an SDN controller to create the overlay network by exchanging routes, configurations, and other data. A virtual router can run as either a Linux kernel module, a DPDK-based process, or on a SmartNIC. DPDK allows a virtual router to process more packets per second than is possible when running as a kernel module. This virtual router may also be containerized. Regardless of how the virtual router is implemented, the cRPD and the virtual router may together implement a virtualized provider edge (PE) router that can implement various types of virtual private networks (VPNs) by receiving and advertising routes across a core layer 3 (L3) network. Example types of VPNs include layer 3 VPNs (L3VPNs), layer 2 VPNs (L2VPNs), and Ethernet VPNs (EVPNs), though other types of VPNs may be implemented using techniques described herein.

The techniques may provide one or more technical advantages that realize at least one practical application. For example, although the containerized routing protocol process and virtual router components of a virtualized PE router described herein are executed by a server or other compute node (rather than a physical device such as a PE router deployed at the logical edge of the layer 3 network), the techniques may nevertheless permit operators to use service provider VPN models in a virtualized computing infrastructure. The techniques may in this way help to bridge the gap between Information Technology (IT) operators and network administrators to allow IT operators to tap into the underlying layer 3 network infrastructure to offer virtual private networking to host workloads without having to deploy and configure physical PE routers. In addition, tenants that deploy containerized workloads to, in part, operate as customer edge (CE) devices can rely on the virtualized PE router to operate similarly to a physical PE router to provide a VPN to interconnect the containerized workloads.

As another example of the technical advantages, although there are many different CNI solutions that provide networking for containers deployed by a container orchestration system, e.g., Kubernetes, these CNI solutions involve creating a virtual bridge device on the host computing device to interconnect pods executing on the host computing device and then using a tunneling mechanism, such as VxLAN or Generic Routing Encapsulation (GRE), to interconnect pods executing on different host computing devices. These CNIs typically lack the ability to work with other types of CNIs operating to implement networking for pods deployed inside or outside a cluster of host computing devices (e.g., a Kubernetes cluster). That is, to connect the workloads on different computing devices, every computing device needs to implement the same kinds of tunneling and in the same way, as specified by the CNI. This can prevent connectivity between a first workload in a cluster and a second workload in another cluster and can also prevent connectivity between the first workload in a cluster and a device attached as a CE device to a physical router, as well as devices reachable via the CE device. By leveraging standard VPN technologies, the virtual PE device can terminate tunnels with other virtualized PE routers and even physical PE devices that also implement those standard VPN technologies, thereby facilitating connectivity among various devices or workloads reachable via any of those virtualized PE routers or physical PE devices.

In an example, a computing device comprises processing circuitry and a storage device, wherein the processing circuitry has access to the storage device; a virtual router executed by the processing circuitry and configured to implement a data plane for a virtualized provider edge (PE) router; a containerized application; a virtual network interface enabling communications between the virtual router and the containerized application; and a containerized routing protocol process executed by the processing circuitry and configured to implement a control plane for the virtualized PE router, the containerized routing protocol process is configured to: obtain a Media Access Control (MAC) address or an Internet Protocol (IP) address sent by the containerized application via the virtual network interface; and execute a first routing protocol to generate and output a route comprising at least one of the MAC address or the IP address to implement a Virtual Private Network (VPN) for the containerized application.

In an example, a container orchestration system, for a cluster of computing devices including a computing device, comprises processing circuitry and a storage device, wherein the processing circuitry is configured to cause the container orchestration system to: deploy a containerized application to a compute node; and in response to deploying the containerized application to the compute node, configure in the compute node a virtual routing and forwarding (VRF) instance to implement a virtual private network (VPN) for the containerized application.

In an example, a non-transitory computer-readable medium comprises instructions that, when executed by processing circuitry of a computing device, causes the computing device to: execute a virtual router to implement a data plane for a virtualized provider edge (PE) router; configure a virtual network interface enabling communications between the virtual router and a containerized application on the computing device; and execute a containerized routing protocol process to implement a control plane for the virtualized PE router to: obtain a Media Access Control (MAC) address or an Internet Protocol (IP) address sent by the containerized application via the virtual network interface, and execute a first routing protocol to generate and output a route comprising at least one of the MAC address or the IP address to implement a Virtual Private Network (VPN) for the containerized application.

The details of one or more examples of this disclosure are set forth in the accompanying drawings and the description below. Other features, objects, and advantages will be apparent from the description and drawings, and from the claims.

BRIEF DESCRIPTION OF DRAWINGS

Like reference characters denote like elements throughout the description and figures.

DETAILED DESCRIPTION

Figure 1:
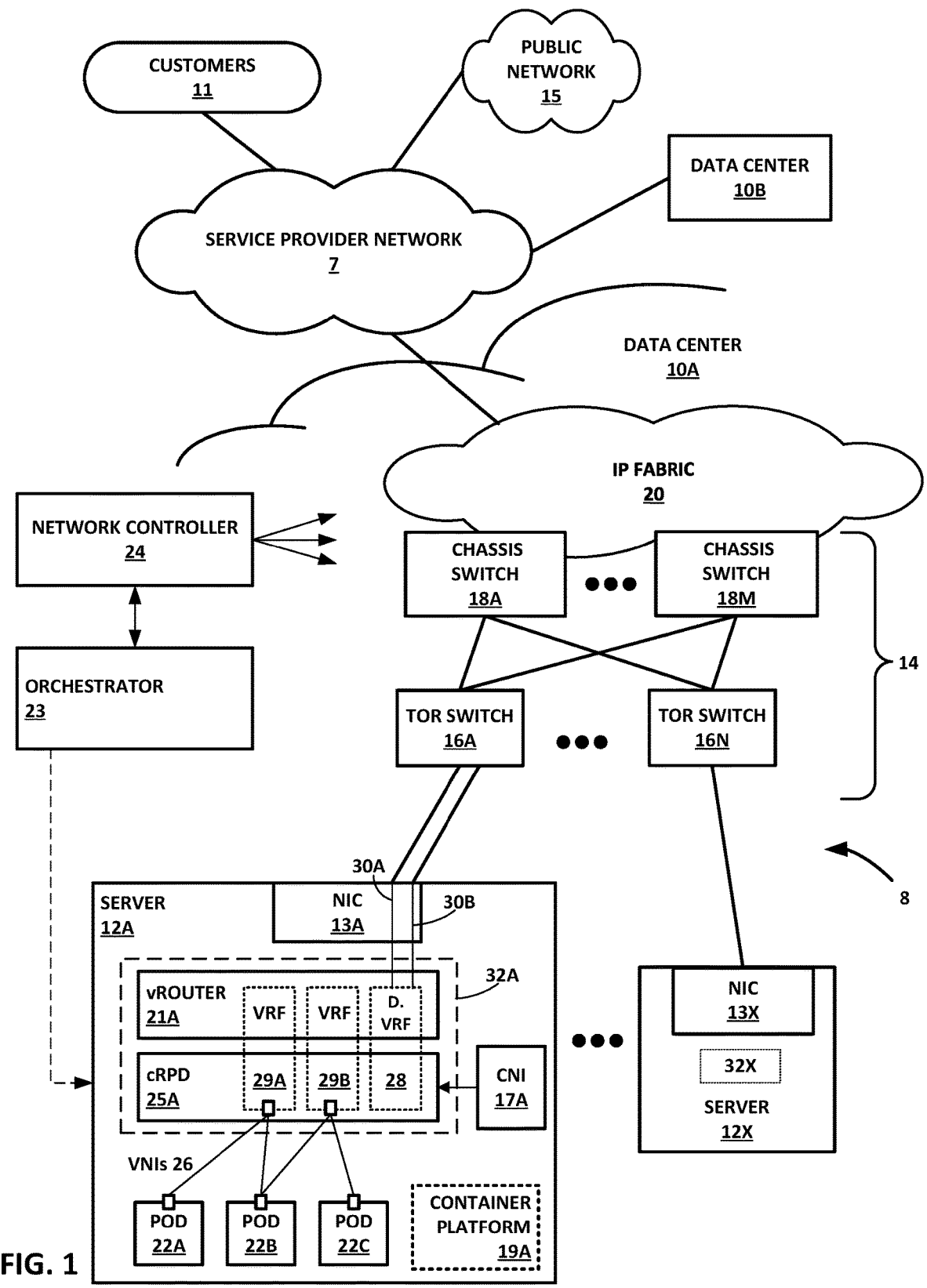
FIG. 1 is a block diagram illustrating an example system in which examples of the techniques described herein may be implemented.

FIG. 1 is a block diagram illustrating an example system in which examples of the techniques described herein may be implemented. The system includes virtualized computing infrastructure 8. In general, data center 10 provides an operating environment for applications and services for customer sites 11 (illustrated as "customers 11") having one or more customer networks coupled to the data center by service provider network 7. Each of data centers 10A-10B (collectively, "data centers 10") may, for example, host infrastructure equipment, such as networking and storage systems, redundant power supplies, and environmental controls. The techniques are described further primarily with respect to data center 10A illustrated in greater detail.

Service provider network 7 is coupled to public network 15, which may represent one or more networks administered by other providers, and may thus form part of a large-scale public network infrastructure, e.g., the Internet. Public network 15 may represent, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates service provider network 7, an enterprise IP network, or some combination thereof.

Although customer sites 11 and public network 15 are illustrated and described primarily as edge networks of service provider network 7, in some examples, one or more of customer sites 11 and public network 15 may be tenant networks within data center 10 or another data center. For example, data center 10A may host multiple tenants (customers) each associated with one or more virtual private networks (VPNs), each of which may implement one of customer sites 11.

Service provider network 7 offers packet-based connectivity to attached customer sites 11, data centers 10, and public network 15. Service provider network 7 may represent a network that is owned and operated by a service provider to interconnect a plurality of networks. Service provider network 7 may implement Multi-Protocol Label Switching (MPLS) forwarding and in such instances may be referred to as an MPLS network or MPLS backbone. In some instances, service provider network 7 represents a plurality of interconnected autonomous systems, such as the Internet, that offers services from one or more service providers. Service provider network 7 may be a layer 3 network and may represent or be part of a core network.

In some examples, data center 10A may represent one of many geographically distributed network data centers. As illustrated in the example of FIG. 1, data center 10A may be a facility that provides network services for customers. A customer of the service provider may be a collective entity such as enterprises and governments or individuals. For example, a network data center may host web services for several enterprises and end users. Other exemplary services may include data storage, virtual private networks, traffic engineering, file service, data mining, scientific- or supercomputing, and so on. Although illustrated as a separate edge network of service provider network 7, elements of data center 10A such as one or more physical network functions (PNFs) or virtualized network functions (VNFs) may be included within the service provider network 7 core.

In this example, data center 10A includes storage and/or compute servers (or "nodes") interconnected via switch fabric 14 provided by one or more tiers of physical network switches and routers, with servers 12A-12X (collectively, "servers 12") depicted as coupled to top-of-rack switches 16A-16N. Servers 12 are computing devices and may also be referred to herein as "hosts," "host devices," "host computing devices," "compute nodes," or other similar term. Although only server 12A coupled to TOR switch 16A is shown in detail in FIG. 1, data center 10A may include many additional servers coupled to other TOR switches 16 of the data center 10A, with such servers having hardware and software components similar to those illustrated with respect to server 12A.

Switch fabric 14 in the illustrated example includes interconnected top-of-rack (TOR) (or other "leaf") switches 16A-16N (collectively, "TOR switches 16") coupled to a distribution layer of chassis (or "spine" or "core") switches 18A-18M (collectively, "chassis switches 18"). Although not shown, data center 10A may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices. Data center 10A may also include one or more physical network functions (PNFs) such as physical firewalls, load balancers, routers, route reflectors, broadband network gateways (BNGs), mobile core network elements, and other PNFs.

In this example, TOR switches 16 and chassis switches 18 provide servers 12 with redundant (multi-homed) connectivity to IP fabric 20 and service provider network 7. Chassis switches 18 aggregate traffic flows and provides connectivity between TOR switches 16. TOR switches 16 may be network devices that provide layer 2 (MAC) and/or layer 3 (e.g., IP) routing and/or switching functionality. TOR switches 16 and chassis switches 18 may each include one or more processors and a memory and can execute one or more software processes. Chassis switches 18 are coupled to IP fabric 20, which may perform layer 3 routing to route network traffic between data center 10A and customer sites 11 by service provider network 7. The switching architecture of data center 10A is merely an example. Other switching architectures may have more or fewer switching layers, for instance. IP fabric 20 may be or include one or more gateway routers.

The term "packet flow," "traffic flow," or simply "flow" refers to a set of packets originating from a particular source device or endpoint and sent to a particular destination device or endpoint. A single flow of packets may be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet.

Servers 12 may each represent a compute server. For example, each of servers 12 may represent a computing device, such as an x86 processor-based server, configured to operate according to techniques described herein. Servers 12 may provide Network Function Virtualization Infrastructure (NFVI) for an NFV architecture that is an example of a virtualized computing infrastructure.

Any server of servers 12 may be configured with virtual execution elements by virtualizing resources of the server to provide an isolation among one or more processes (applications) executing on the server. "Hypervisor-based" or "hardware-level" or "platform" virtualization refers to the creation of virtual machines that each includes a guest operating system for executing one or more processes. In general, a virtual machine provides a virtualized/guest operating system for executing applications in an isolated virtual environment. Because a virtual machine is virtualized from physical hardware of the host server, executing applications are isolated from both the hardware of the host and other virtual machines. Each virtual machine may be configured with one or more virtual network interfaces (VNIs) for communicating on corresponding virtual networks.

Virtual networks are logical constructs implemented on top of the physical networks. Virtual networks may be used to replace VLAN-based isolation and provide multi-tenancy in a virtualized data center, e.g., data center 10A. Each tenant or an application can have one or more virtual networks. Each virtual network may be isolated from all the other virtual networks unless explicitly allowed by security policy.

Virtual networks can be connected to and extended across physical Multi-Protocol Label Switching (MPLS) Layer 3 Virtual Private Networks (L3VPNs) and Ethernet Virtual Private Networks (EVPNs) networks using a datacenter 10 gateway router (not shown in FIG. 1). Virtual networks may also be used to implement Network Function Virtualization (NFV) and service chaining.

Virtual networks can be implemented using a variety of mechanisms. For example, each virtual network could be implemented as a Virtual Local Area Network (VLAN), Virtual Private Networks (VPN), etc. A virtual network can also be implemented using two networks—the physical underlay network made up of IP fabric 20 and switching fabric 14 and a virtual overlay network. The role of the physical underlay network is to provide an "IP fabric," which provides unicast IP connectivity from any physical device (server, storage device, router, or switch) to any other physical device. The underlay network may provide uniform low-latency, non-blocking, high-bandwidth connectivity from any point in the network to any other point in the network.

As described further below with respect to virtual router 21A, virtual routers running in servers 12 may create a virtual overlay network on top of the physical underlay network using a mesh of dynamic "tunnels" amongst themselves. These overlay tunnels can be MPLS over GRE/UDP tunnels, or VXLAN tunnels, or NVGRE tunnels, for instance. The underlay physical routers and switches may not store any per-tenant state for virtual machines or other virtual execution elements, such as any Media Access Control (MAC) addresses, IP address, or policies. The forwarding tables of the underlay physical routers and switches may, for example, only contain the IP prefixes or MAC addresses of the physical servers 12. (Gateway routers or switches that connect a virtual network to a physical network are an exception and may contain tenant MAC or IP addresses.)

Virtual routers 21A-21X (collectively, "virtual routers 21") of servers 12 often contain per-tenant state. For example, they may contain a separate forwarding table (a routing-instance) per virtual network. That forwarding table contains the IP prefixes (in the case of a layer 3 overlays) or the MAC addresses (in the case of layer 2 overlays) of the virtual machines or other virtual execution elements (e.g., pods of containers). No single virtual router 21 needs to contain all IP prefixes or all MAC addresses for all virtual machines in the entire data center. A given virtual router 21 only needs to contain those routing instances that are locally present on the server 12 (i.e., which have at least one virtual execution element present on the server 12 and requiring the routing instance.)

The control plane protocol between the control plane nodes of the network controller 24 or a physical gateway router (or switch) may be BGP (and may be Netconf for management). This is the same control plane protocol may also be used for MPLS L3VPNs and MPLS EVPNs. The protocol between the network controller 24 and the virtual routers 21 may be based on XMPP, for instance.

"Container-based" or "operating system" virtualization refers to the virtualization of an operating system to run multiple isolated systems on a single machine (virtual or physical). Such isolated systems represent containers, such as those provided by the open-source DOCKER Container application or by CoreOS Rkt ("Rocket"). Like a virtual machine, each container is virtualized and may remain isolated from the host machine and other containers. However, unlike a virtual machine, each container may omit an individual operating system and instead provide an application suite and application-specific libraries. In general, a container is executed by the host machine as an isolated user-space instance and may share an operating system and common libraries with other containers executing on the host machine. Thus, containers may require less processing power, storage, and network resources than virtual machines. A group of one or more containers may be configured to share one or more virtual network interfaces for communicating on corresponding virtual networks.

In some examples, containers are managed by their host kernel to allow limitation and prioritization of resources (CPU, memory, block I/O, network, etc.) without the need for starting any virtual machines, in some cases using namespace isolation functionality that allows complete isolation of an application's (e.g., a given container) view of the operating environment, including process trees, networking, user identifiers and mounted file systems. In some examples, containers may be deployed according to Linux Containers (LXC), an operating-system-level virtualization method for running multiple isolated Linux systems (containers) on a control host using a single Linux kernel.

A Kubernetes Pod is a group of one or more logically-related containers with shared namespaces and shared file-system volumes. Each Pod is assigned a unique IP address. Containers of a Pod shares the network namespace, which includes the IP address and network ports. Containers of a Pod can communicate with one another using localhost. however, when containers in a Pod communicate with entities outside the Pod, the containers may share an IP address and port space. The containers in a Pod can also communicate with each other using standard inter-process communications. Containers in different Pods have different IP addresses. Containers that want to interact with a container running in a different Pod can use IP networking to communicate, and this is typically set up using a Container Network Interface (CNI).

Servers 12 host virtual network endpoints for one or more virtual networks that operate over the physical network represented here by IP fabric 20 and switch fabric 14. Although described primarily with respect to a data center-based switching network, other physical networks, such as service provider network 7, may underlie the one or more virtual networks.

Each of servers 12 may host one or more virtual execution elements each having at least one virtual network endpoint for one or more virtual networks configured in the physical network. A virtual network endpoint for a virtual network may represent one or more virtual execution elements that share a virtual network interface for the virtual network. For example, a virtual network endpoint may be a virtual machine, a set of one or more containers (e.g., a pod), or another other virtual execution element(s), such as a layer 3 endpoint for a virtual network. The term "virtual execution element" encompasses virtual machines, containers, and other virtualized computing resources that provide an at least partially independent execution environment for applications. The term "virtual execution element" may also encompass a pod of one or more containers. As shown in FIG. 1, server 12A hosts multiple virtual network endpoints in the form of pods 22A-22C each having one or more containers. However, a server 12 may execute as many virtual execution elements as is practical given hardware resource limitations of the server 12. Each of the virtual network endpoints may use one or more virtual network interfaces to perform packet I/O or otherwise process a packet. For example, a virtual network endpoint may use one virtual hardware component (e.g., an SR-IOV virtual function) enabled by NIC 13A to perform packet I/O and receive/send packets on one or more communication links with TOR switch 16A. Other examples of virtual network interfaces are described below.

Servers 12 include respective network interface cards (NICs) 13A-13X (collectively, "NICs 13"), which each includes at least one interface to exchange packets with TOR switches 16 over a communication link. For example, server 12A includes NIC 13A illustrated as having two links to TOR switch 16A. Any of NICs 13 may provide one or more virtual hardware components for virtualized input/output (I/O). A virtual hardware component for I/O maybe a virtualization of the physical NIC (the "physical function"). For example, in Single Root I/O Virtualization (SR-IOV), which is described in the Peripheral Component Interface Special Interest Group SR-IOV specification, the PCIe Physical Function of the network interface card (or "network adapter") is virtualized to present one or more virtual network interfaces as "virtual functions" for use by respective endpoints executing on the server 12. In this way, the virtual network endpoints may share the same PCIe physical hardware resources and the virtual functions are examples of virtual hardware components. As another example, one or more servers 12 may implement Virtio, a para-virtualization framework available, e.g., for the Linux Operating System, that provides emulated NIC functionality as a type of virtual hardware component to provide virtual network interfaces to virtual network endpoints. As another example, one or more servers 12 may implement Open vSwitch to perform distributed virtual multilayer switching between one or more virtual NICs (vNICs) for hosted virtual machines, where such vNICs may also represent a type of virtual hardware component that provide virtual network interfaces to virtual network endpoints. In some instances, the virtual hardware components are virtual I/O (e.g., NIC) components. In some instances, the virtual hardware components are SR-IOV virtual functions. In some examples, any server of servers 12 may implement a Linux bridge that emulates a hardware bridge and forwards packets among virtual network interfaces of the server or between a virtual network interface of the server and a physical network interface of the server. For Docker implementations of containers hosted by a server, a Linux bridge or other operating system bridge, executing on the server, that switches packets among containers may be referred to as a "Docker bridge." The term "virtual router" as used herein may encompass a Contrail or Tungsten Fabric virtual router, Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. Virtual router 21A is an example of such a virtual router.

One or more of servers 12 may each include a corresponding virtual router 21 that executes one or more routing instances for corresponding virtual networks within data center 10A to provide virtual network interfaces and route packets among the virtual network endpoints. Each of the routing instances may be associated with a network forwarding table. Each of the routing instances may include a virtual routing and forwarding instance (VRF) for an Internet Protocol-Virtual Private Network (IP-VPN). Packets received by the virtual router 21A (illustrated as "vROUTER 21A") of server 12A, for instance, from the underlying physical network fabric of data center 10A (i.e., IP fabric 20 and switch fabric 14) may include an outer header to allow the physical network fabric to tunnel the payload or "inner packet" to a physical network address for a network interface card 13A of server 12A that executes the virtual router. The outer header may include not only the physical network address of the network interface card 13A of the server but also a virtual network identifier such as a VxLAN tag or Multiprotocol Label Switching (MPLS) label that identifies one of the virtual networks as well as the corresponding routing instance executed by the virtual router 21A. An inner packet includes an inner header having a destination network address that conforms to the virtual network addressing space for the virtual network identified by the virtual network identifier.

Virtual routers 21 terminate virtual network overlay tunnels and determine virtual networks for received packets based on tunnel encapsulation headers for the packets, and forwards packets to the appropriate destination virtual network endpoints for the packets. For server 12A, for example, for each of the packets outbound from virtual network endpoints hosted by server 12A (e.g., any of pods 22A-22C), the virtual router 21A attaches a tunnel encapsulation header indicating the virtual network for the packet to generate an encapsulated or "tunnel" packet, and virtual router 21A outputs the encapsulated packet via overlay tunnels for the virtual networks to a physical destination computing device, such as another one of servers 12. As used herein, a virtual router 21 may execute the operations of a tunnel endpoint to encapsulate inner packets sourced by virtual network endpoints to generate tunnel packets and decapsulate tunnel packets to obtain inner packets for routing to other virtual network endpoints.

Each of virtual routers 21 may represent a SmartNIC-based virtual router, kernel-based virtual router (i.e., executed as a kernel module), or a Data Plane Development Kit (DPDK)-enabled virtual router in various examples. A DPDK-enabled virtual router 21A may use DPDK as a data plane. In this mode, virtual router 21A runs as a user space application that is linked to the DPDK library (not shown). This is a performance version of a virtual router and is commonly used by telecommunications companies, where the VNFs are often DPDK-based applications. The performance of virtual router 21A as a DPDK virtual router can achieve ten times higher throughput than a virtual router operating as a kernel-based virtual router. The physical interface is used by DPDK's poll mode drivers (PMDs) instead of Linux kernel's interrupt-based drivers.

A user-I/O (UIO) kernel module, such as vfio or uio_pci_generic, may be used to expose a physical network interface's registers into user space so that they are accessible by the DPDK PMD. When NIC 13A is bound to a UIO driver, it is moved from Linux kernel space to user space and therefore no longer managed nor visible by the Linux OS. Consequently, it is the DPDK application (i.e., virtual router 21A in this example) that fully manages the NIC 13. This includes packets polling, packets processing, and packets forwarding. User packet processing steps may be performed by the virtual router 21A DPDK data plane with limited or no participation by the kernel (kernel not shown in FIG. 1). The nature of this "polling mode" makes the virtual router 21A DPDK data plane packet processing/forwarding much more efficient as compared to the interrupt mode, particularly when the packet rate is high. There are limited or no interrupts and context switching during packet I/O.

Additional details of an example of a DPDK vRouter are found in "DAY ONE: CONTRAIL DPDK vROUTER," 2021, Kiran K N et al., Juniper Networks, Inc., which is incorporated by reference herein in its entirety.

Servers 12 include and execute containerized routing protocol daemons 25A-25X (collectively, "cRPDs 25"). A containerized routing protocol daemon (cRPD) is a routing protocol process that is packaged as a container and may run in Linux-based environments. cRPD may be executed in the user space of the host as a containerized process. Thus, cRPD makes available the rich routing software pedigree of physical routers on Linux-based compute nodes, e.g., servers 12 in some cases. cRPD provides control plane functionality. This control plane is thus containerized. For example, cRPD 25A implements the control plane for a virtualized router 32A executed by server 12A.

Virtual routers 21, meanwhile, are the software entities that provide data plane functionality on servers 12. CRPD 25A may use the forwarding plane provided by the Linux kernel of server 12A for a kernel-based virtual router 21A. CRPD 25A may alternatively use a DPDK-enabled or SmartNIC-executed instance of virtual router 21. Virtual router 21A may work with an SDN controller (e.g., network controller 24) to create the overlay network by exchanging routes, configurations, and other data. Virtual router 21A may be containerized. In combination, the containerized cRPD and containerized virtual router may thus be a fully functional containerized, virtualized router 32A in some examples.

Virtualized computing infrastructure 8 implements an automation platform for automating deployment, scaling, and operations of virtual execution elements across servers 12 to provide virtualized infrastructure for executing application workloads and services. In some examples, the platform may be a container orchestration platform that provides a container-centric infrastructure for automating deployment, scaling, and operations of containers to provide a container-centric infrastructure. "Orchestration," in the context of a virtualized computing infrastructure generally refers to provisioning, scheduling, and managing virtual execution elements and/or applications and services executing on such virtual execution elements to the host servers available to the orchestration platform. Container orchestration, specifically, permits container coordination and refers to the deployment, management, scaling, and configuration, e.g., of containers to host servers by a container orchestration platform. Example instances of orchestration platforms include Kubernetes, Docker swarm, Mesos/Marathon, OpenShift, OpenStack, VMware, and Amazon ECS.

Orchestrator 23 represent one or more orchestration components for a container orchestration system. Orchestrator 23 orchestrates at least containerized RPDs 25. In some examples, the data plane virtual routers 21 are also containerized and orchestrated by orchestrator 23. The data plane may be a DPDK-based virtual router, for instance.

Elements of the automation platform of computing infrastructure 8 include at least servers 12, orchestrator 23, and network controller 24. Containers may be deployed to a virtualization environment using a cluster-based framework in which a cluster master node of a cluster manages the deployment and operation of containers to one or more cluster minion nodes of the cluster. The terms "master node" and "minion node" used herein encompass different orchestration platform terms for analogous devices that distinguish between primarily management elements of a cluster and primarily container hosting devices of a cluster. For example, the Kubernetes platform uses the terms "cluster master" and "minion nodes," while the Docker Swarm platform refers to cluster managers and cluster nodes.

Orchestrator 23 and network controller 24 may execute on separate computing devices, execute on the same computing device. Each of orchestrator 23 and network controller 24 may be a distributed application that executes on one or more computing devices. Orchestrator 23 and network controller 24 may implement respective master nodes for one or more clusters each having one or more minion nodes implemented by respective servers 12 (also referred to as "compute nodes").

In general, network controller 24 controls the network configuration of the data center 10A fabric to, e.g., establish one or more virtual networks for packetized communications among virtual network endpoints. Network controller 24 provides a logically and in some cases physically centralized controller for facilitating operation of one or more virtual networks within data center 10A. In some examples, network controller 24 may operate in response to configuration input received from orchestrator 23 and/or an administrator/operator. Additional information regarding network controller 24 operating in conjunction with other devices of data center 10A or other software-defined network is found in International Application Number PCT/US2013/044378, filed Jun. 5, 2013, and entitled "PHYSICAL PATH DETERMINATION FOR VIRTUAL NETWORK PACKET FLOWS;" and in U.S. patent application Ser. No. 14/226, 509, filed Mar. 26, 2014, and entitled "Tunneled Packet Aggregation for Virtual Networks," each which is incorporated by reference as if fully set forth herein.

In general, orchestrator 23 controls the deployment, scaling, and operations of containers across clusters of servers 12 and providing computing infrastructure, which may include container-centric computing infrastructure. Orchestrator 23 and, in some cases, network controller 24 may implement respective cluster masters for one or more Kubernetes clusters. As an example, Kubernetes is a container management platform that provides portability across public and private clouds, each of which may provide virtualization infrastructure to the container management platform. Example components of a Kubernetes container orchestration system are described below with respect to FIG. 4.

In one example, pod 22A is a Kubernetes pod and an example of a virtual network endpoint. A pod is a group of one or more logically-related containers (not shown in FIG.

1), the shared storage for the containers, and options on how to run the containers. Where instantiated for execution, a pod may alternatively be referred to as a "pod replica." Each container of pod 22A is an example of a virtual execution element. Containers of a pod are always co-located on a single server, co-scheduled, and run in a shared context. The shared context of a pod may be a set of Linux namespaces, cgroups, and other facets of isolation. Within the context of a pod, individual applications might have further sub-isolations applied. Typically, containers within a pod have a common IP address and port space and are able to detect one another via the localhost. Because they have a shared context, containers within a pod are also communicate with one another using inter-process communications (IPC). Examples of IPC include SystemV semaphores or POSIX shared memory. Generally, containers that are members of different pods have different IP addresses and are unable to communicate by IPC in the absence of a configuration for enabling this feature. Containers that are members of different pods instead usually communicate with each other via pod IP addresses.

Server 12A includes a container platform 19A for running containerized applications, such as those of pod 22A. Container platform 19A receives requests from orchestrator 23 to obtain and host, in server 12A, containers. Container platform 19A obtains and executes the containers.

Container platform 19A includes a container network interface (CNI) 17A that configures virtual network interfaces for virtual network endpoints. The orchestrator 23 and container platform 19A uses CNI 17A to manage networking for pods, including pod 22A. For example, the CNI 17A creates virtual network interfaces to connect pods to virtual router 21A and enable containers of such pods to communicate, via the virtual network interfaces, to other virtual network endpoints over the virtual networks. CNI 17A may, for example, insert a virtual network interface for a virtual network into the network namespace for containers in pod 22A and configure (or request to configure) the virtual network interface for the virtual network in virtual router 21A such that the virtual router 21A is configured to send packets received from the virtual network via the virtual network interface to containers of pod 22A and to send packets received via the virtual network interface from containers of pod 22A on the virtual network. CNI 17A may assign a network address (e.g., a virtual IP address for the virtual network) and may set up routes for the virtual network interface. In Kubernetes, by default all pods can communicate with all other pods without using network address translation (NAT). In some cases, the orchestrator 23 and network controller 24 create a service virtual network and a pod virtual network that are shared by all namespaces, from which service and pod network addresses are allocated, respectively. In some cases, all pods in all namespaces that are spawned in the Kubernetes cluster may be able to communicate with one another, and the network addresses for all of the pods may be allocated from a pod subnet that is specified by the orchestrator 23. When a user creates an isolated namespace for a pod, orchestrator 23 and network controller 24 may create a new pod virtual network and new shared service virtual network for the new isolated namespace. Pods in the isolated namespace that are spawned in the Kubernetes cluster draw network addresses from the new pod virtual network, and corresponding services for such pods draw network addresses from the new service virtual network.

Kubernetes networking between pods is via plug-ins called Container Network Interfaces (CNIs) (also known as Container Network Interface plugins). However, the networking capabilities of typical CNIs are rather rudimentary and not suitable when the containerized network functions the CNI serves play a pivotal role within a network. A virtualized router, as described herein, provides a better fit for these situations. A virtualized router is a router with a containerized control plane that allows an x86 or ARM based host to be a first-class member of the network routing system, participating in protocols such as Intermediate System to Intermediate System (IS-IS) and Border Gateway Protocol (BGP) and providing Multiprotocol Label Switching/Segment Routing (MPLS/SR) based transport and multi-tenancy. In other words, rather than the platform being an appendage to the network (like a customer edge (CE) router), it may be operating as a provider edge (PE) router.

CNI 17A may represent a library, a plugin, a module, a runtime, or other executable code for server 12A. CNI 17A may conform, at least in part, to the Container Network Interface (CNI) specification or the rkt Networking Proposal. CNI 17A may represent a Contrail, OpenContrail, Multus, Calico, cRPD, or other CNI. CNI 17A may alternatively be referred to as a network plugin or CNI plugin or CNI instance. Separate CNIs may be invoked by, e.g., a Multus CNI to establish different virtual network interfaces for pod 202A.

CNI 17A is invoked by orchestrator 23. For purposes of the CNI specification, a container can be considered synonymous with a Linux network namespace. What unit this corresponds to depends on a particular container runtime implementation: for example, in implementations of the application container specification such as rkt, each pod runs in a unique network namespace. In Docker, however, network namespaces generally exist for each separate Docker container. For purposes of the CNI specification, a network refers to a group of entities that are uniquely addressable and that can communicate amongst each other. This could be either an individual container, a machine/server (real or virtual), or some other network device (e.g., a router). Containers can be conceptually added to or removed from one or more networks. The CNI specification specifies a number of considerations for a conforming plugin ("CNI plugin").

Because cRPD 25A is a cloud-native application, it supports installation using Kubernetes manifests or Helm Charts. This includes the initial configuration of cRPD 25A as the control plane for virtualized router 32A, including configuration of routing protocols and one or more virtual private networks. A cRPD may be orchestrated and configured, in a matter of seconds, with all of the routing protocol adjacencies with the rest of the network up and running. Ongoing configuration changes during the lifetime of cRPD 25A may be via a choice of CLI, Kubernetes manifests, NetConf or Terraform.

By adopting a Kubernetes CNI framework, virtualized router 32A may mitigate the traditional operational overhead incurred when using a containerized appliance rather than its physical counterpart. By exposing the appropriate device interfaces, virtualized router 32A may normalize the operational model of the virtual appliance to the physical appliance, eradicating the barrier to adoption within the operator's network operations environment. Virtualized router 32A may present a familiar routing appliance look-and-feel to any trained operations team. Virtualized router 32A has similar features and capabilities, and a similar operational model as a hardware-based platform. Likewise, a domain-controller can use the protocols that it is uses with any other router to communicate with and control virtualized router 32A, for example Netconf/OpenConfig, gRPC, Path Computation Element Protocol (PCEP), or other interfaces.

In accordance with techniques of this disclosure, virtualized router 32A may participate in IS-IS, Open Shortest Path First (OSPF), BGP, and/or other interior or exterior routing protocols and exchange routing protocol messages with other routers, whether physical routers or virtualized routers 32B-32X (collectively, "virtualized routers 32") residing on other hosts. In addition, MPLS may be used, often based on Segment Routing (SR). The reason for this is two-fold: to allow Traffic Engineering if needed, and to underpin multi-tenancy, by using VPNs, such as MPLS-based Layer 3 VPNs or EVPNs.

A virtual private network (VPN) offered by a service provider consists of two topological areas: the provider's network and the customer's network. The customer's network is commonly located at multiple physical sites and is also private (non-Internet). A customer site would typically consist of a group of routers or other networking equipment located at a single physical location. The provider's network, which runs across the public Internet infrastructure, consists of routers that provide VPN services to a customer's network as well as routers that provide other services. The provider's network connects the various customer sites in what appears to the customer and the provider to be a private network.

To ensure that VPNs remain private and isolated from other VPNs and from the public Internet, the provider's network maintains policies that keep routing information from different VPNs separate. A provider can service multiple VPNs as long as its policies keep routes from different VPNs separate. Similarly, a customer site can belong to multiple VPNs as long as it keeps routes from the different VPNs separate. In this disclosure, reference to a customer or customer network may not necessarily refer to an independent entity or business but may instead refer to a data center tenant, a set of workloads connected via a VPN across a layer 3 network, or some other logical grouping.

Although developed to run across service provider networks and the public Internet, VPN technology can be offered by any layer 3 network, and similar terminology is used. The provider network is often referred to instead as the layer 3 core network or simply the layer 3 network or core network. Layer 3 VPN operates at the Layer 3 level of the OSI model, the Network layer. A Layer 3 VPN is composed of a set of customer networks that are connected over the core network. A peer-to-peer model is used to connect to the customer sites, where the provider edge (PE) routers learn the customer routes on peering with customer edge (CE) devices. The common routing information is shared across the core network using multiprotocol BGP (MP-BGP), and the VPN traffic is forwarded among the PE routers using MPLS. Layer 3 VPNs may be based on Rosen & Rekhter, "BGP/MPLS IP Virtual Private Networks (VPNs)," Request for Comments 4364, Internet Engineering Task Force, Network Working Group, February 2006, which is incorporated by reference herein in its entirety.

Customer Edge (CE) devices connect to the provider network and may (or may not) offer reachability to other networks. PE devices are part of the layer 3 core network and connect to one or more CE devices to offer VPN services. In a PE router, the IP routing table (also called the global routing table or default routing table) contains service provider or underlay network routes not included in a virtual routing and forwarding (VRF) table. Provider edge devices need the IP routing table to be able to reach each other, while the VRF table is needed to reach all customer devices on a particular VPN. For example, a PE router with Interface A to a CE router and a core-facing Interface B places the Interface A addresses in the VRF and the Interface B addresses in the global IP routing table for the default VRF.

The virtual routing and forwarding (VRF) table distinguishes the routes for different VPNs, as well as VPN routes from provider/underlay routes on the PE device. These routes can include overlapping private network address spaces, customer-specific public routes, and provider routes on a PE device useful to the customer. A VRF instance consists of one or more routing tables, a derived forwarding table, the interfaces that use the forwarding table, and the policies and routing protocols that determine what goes into the forwarding table. Because each instance is configured for a particular VPN, each VPN has separate tables, rules, and policies that control its operation. A separate VRF table is created for each VPN that has a connection to a CE device. The VRF table is populated with routes received from directly connected CE devices associated with the VRF instance, and with routes received from other PE routers in the same VPN.

A Layer 3 VPN uses a peer routing model between PE router and CE devices that directly connect. That is, without needing multiple hops on the layer 3 core network to connect PE router and CE device pairs. The PE routers distribute routing information to all CE devices belonging to the same VPN, based on the BGP route distinguisher, locally and across the provider network. Each VPN has its own routing table for that VPN, coordinated with the routing tables in the CE and PE peers. A PE router can connect to more than one CE device, so the PE router has a general IP routing table and VRF table for each attached CE with a VPN.

In a Layer 2 VPN, traffic is forwarded to the router in L2 format. It is carried by MPLS over the layer 3 core network and then converted back to L2 format at the receiving site. You can configure different Layer 2 formats at the sending and receiving sites. On a Layer 2 VPN, routing is performed by the CE device, which must select the appropriate link on which to send traffic. The PE router receiving the traffic sends it across the layer 3 core network to the PE router connected to the receiving CE device. The PE routers do not need to store or process VPN routes. The PE routers only need to be configured to send data to the appropriate tunnel. The PE routers carry traffic between the CE devices using Layer 2 VPN interfaces. The VPN topology is determined by policies configured on the PE routers.

Ethernet VPN (EVPN) is a standards-based technology that provides virtual multipoint bridged connectivity between different Layer 2 domains over an IP or IP/MPLS backbone network. Like other VPN technologies, such as Layer 3 VPN and virtual private LAN service (VPLS), EVPN instances are configured on provider edge (PE) routers to maintain logical service separation between customers. The PE routers connect to CE devices, which can be routers, switches, or hosts. The PE routers then exchange reachability information using Multiprotocol BGP (MP-BGP), and encapsulated traffic is forwarded between PE routers. Elements of the EVPN architecture are common with other VPN technologies, such as Layer 3 VPNs, with the EVPN MAC-VRF being a type of VRF for storing MAC addresses on a PE router for an EVPN instance. An EVPN instance spans the PE devices participating in a particular EVPN and is thus similar conceptually to a Layer 3 VPN. Additional information about EVPNs if found in Sajassi et al., "BGP MPLS-Based Ethernet VPN," Request for Comments 7432, Internet Engineering Task Force, February 2015, which is incorporated by reference herein in its entirety.

Virtualized router 32A may operate as a provider edge (PE) router, i.e., a virtualized PE router. Virtualized router 32A may exchange VPN routes via BGP with other PE routers in the network, regardless of whether those other PEs are physical routers or virtualized routers 32 residing on other hosts. Each tenant may be placed in a separate VRF table on the virtualized router 32A, giving the correct degree of isolation and security between tenants, just as with a conventional VPN service. This neatly solves the problem that Kubernetes does not natively provide such isolation. VPNs are a tried and tested method for achieving multi-tenancy in networking and is trusted by the many major corporations worldwide who buy this service from their network service providers.

Virtualized routers 32 may in this way bring the full spectrum of routing capabilities to computing infrastructure that hosts containerized applications. This may allow the platform to fully participate in the operator's network routing system and facilitate multi-tenancy. It may provide the same familiar look-and-free, operational experience and control-plane interfaces as a hardware-based router to provide virtual private networking to containerized applications.

In some cases, cRPD 25A may interface with two data planes, the kernel network stack for the compute node and the DPDK-based virtual router. CRPD 25A may leverage the kernel's networking stack to set up routing exclusively for the DPDK fast path. The routing information cRPD 25A receives can include underlay routing information and overlay routing information. CRPD 25A may run routing protocols on the vHost interfaces that are visible in the kernel, and cRPD 25A may install forwarding information base (FIB) updates corresponding to interior gateway protocol (IGP)-learned routes (underlay) in the kernel FIB (e.g., to enable establishment of multi-hop interior Border Gateway Protocol (iBGP) sessions to those destinations). Concurrently, virtual router 21A may notify cRPD 25a about the Application Pod interfaces created by CNI 17A for the compute node. CRPD 25A may advertise reachability to these Pod interfaces to the rest of the network as, e.g., L3VPN network layer reachability information (NLRI). Corresponding Multi-Protocol Label Switching (MPLS) routes may be programmed on the virtual router 21A, for the next-hop of these labels is a "POP and forward" operation to the Pod interface, and these interfaces are only visible in the virtual router. Similarly, reachability information received over BGP L3VPN may only be programmed to virtual router 21A, for PODs may need such reachability information for forwarding.

cRPD 25A includes default VRF 28 (illustrated as "D. VRF 28") and VRFs 29A-29B (collectively, "VRFs 29"). Default VRF 28 stores the global routing table. cRPD 25A programs forwarding information derived from VRFs 29 into virtual router 21A. In this way, virtual router 21A implements the VPNs for VRFs 29, which are illustrated as included in both virtual router 21A and cRPD 25A.

cRPD 25A is configured to operate in host network mode, also referred to as native networking. cRPD 25A therefore uses the network namespace and IP address(es) of its host, i.e., server 12A. cRPD 25A has visibility and access to network interfaces 30A-30B of NIC 13A, which are inserted into default VRF 28 and considered by cRPD 25A as core-facing interfaces. Interfaces 30A-30B are connected to switch fabric 14 and may be Ethernet interfaces. Interfaces 30 are considered and used as core-facing interfaces by cRPD 25A for providing VPNs, for interfaces 30 may be used to transport VPN service traffic over a layer 3 network made up of one or more of switch fabric 14, IP fabric 20, service provider network 7, or public network 15.

In accordance with techniques of this disclosure, CNI 17A uses virtual network interface configuration data provided by network controller 24 to configure virtual network interfaces 26 (illustrated as "VNIs 26") among pods 22A-22C and virtualized router 32A to enable network communications between pod 22 and virtual router 21A, thereby permitting application of the VPN service model that is typically deployed in service provider networks. Pods 22A-22C are effectively modeled as a CE router or host device, and pods 22A-22C are enabled to interact, via virtual network interfaces 26, with virtualized router 32A that is modeled as a PE router. Virtual network interfaces 26 effectively become attachment circuits (for L3VPNs) or links of an Ethernet segment (for EVPNs) connecting pods 22 to VRFs 29 of virtualized router 32A, which is operating as a PE router.

Each of virtual network interfaces 26 is inserted into at least one of VRFs 29A-29B of virtualized router 32A. In FIG. 1, pod 22A has a virtual network interface 26 with VRF 29A, pod 22B has virtual network interfaces 26 with VRFs 29A and 29B, and pod 22C has a virtual network interface 26 with VRF 29B. Virtual network interfaces 26 may represent veth pairs, where each end of the veth pair is a separate device (e.g., a Linux/Unix device) with one end of each veth pair inserted into a VRF and one end inserted into a pod. The veth pair or an end of a veth pair are sometimes referred to as "ports". A virtual network interface may represent a macvlan network with media access control (MAC) addresses assigned to the pods 22 and to virtual router 21A for communications between containers of pods 22 and virtual router 21A. In the case of a DPDK-enabled virtual router 21A, virtual network interfaces 26 may each represent a DPDK (e.g., vhost) interface, with one end of the DPDK interface inserted into a VRF and one end inserted into a pod. A pod 22 may operate as a vhost server in some examples, with virtual router 21A as the vhost client, for setting up a DPDK interface. Virtual router 21A may operate as a vhost server in some examples, with a pod 22 as the vhost client, for setting up a DPDK interface. Virtual network interfaces may alternatively be referred to as virtual machine interfaces (VMIs), pod interfaces, container network interfaces, tap interfaces, veth interfaces, or simply network interfaces (in specific contexts), for instance.

As a result, cRPD 25A and any of pods 22 can become routing protocol peers over virtual network interfaces 26. IP addresses assigned to pods 22 are learned via routing protocol messages exchanged between pods 22 and cRPD 25A. cRPD 25A executes the routing protocols and exchanges routing protocol messages on one or more of the core-facing interfaces 30 using routing protocol peering sessions with routing protocol peers in the core layer 3 network. Routing protocol messages output by cRPD 25A may include IP address information for pods 22 or, more specifically, the IP addresses of virtual network interfaces 26 for pods 22 (distinct from the server 12A host IP address). cRPD 25A can therefore extend the overlay for VPNs, implemented using VRFs 29, to pods 22 and thereby enable the pods to operate as CE or host devices in a VPN.

In some examples, the same service IP address or shared anycast IP address is given to multiple Pods for Equal-cost multipath (ECMP) or weighted ECMP. By advertising this shared IP address using BGP-add path into the network, the system can these load balancing technologies at layer 3. Existing Kubernetes load balancers provide L4-L7 application based load balancing. While typical layer load balancing uses NAT/firewall or a specialized module inside forwarding plane, the techniques can be used to achieve load balancing using the network routing itself.

In some examples, a Pod can have multiple interfaces to different cRPD VRFs 29, e.g., one for management traffic, another for data traffic. In FIG. 1, pod 22B may use VRF 29B for management traffic and VRF 29A for data traffic, for instance.

A Pod 22, e.g., pod 22A, might be connected to some physical interfaces where it is learning IP addresses of other devices, such as User Equipment where the Pod is implementing a mobile network gateway or a customer network subnet where the Pod is implementing a CE router or gateway. To advertise these IP addresses into the network, pod 22A treats the virtual network interface 26 with a VRF 29 as an IP link and advertises routes for these IP addresses to cRPD 25A. CRPD 25A can then advertise reachability for these IP addresses through cRPD 25A and pod 22A as a next hop, again conforming to a VPN service model. cRPD 25A programs virtual router 21 with corresponding forwarding information derived from the VRFs 29 and default VRF 28, and virtual router 21 forwarding VPN traffic according to the VPN service model to implement the VPNs.

CRPD 25A may apply many different types of overlay networks/VPNs, including L3 VPN or EVPN (Type-2/Type-5), using a variety of underlay tunneling types, including MPLS, SR-MPLS, SRv6, MPLSoUDP, MPLSoGRE, or IP-in-IP, for example.

CNI 17A may configure, for pod 22s, in conjunction with one or more other components shown in FIG. 1, virtual network interfaces 26. Any of the containers of a pod 22 may utilize, i.e., share, any virtual network interface of the pod. Orchestrator 23 may store or otherwise manage virtual network interface configuration data for application deployments. Orchestrator 23 may receive specification for containerized applications ("pod specifications" in the context of Kubernetes) and network attachment definitions from a user, operator/administrator, or other machine system, for instance, and network controller 24 may derive the configuration data from this information for configuring VRFs 29 and default VRF 28; and configuring virtual network interfaces 26.

For example, as part of the process of creating pod 22A, orchestrator 23 may request that network controller 24 create a virtual network interface for VRF 29A indicated in a pod specification and network attachment definition referred to by the pod specification. In accordance with techniques of this disclosure, the network attachment definition and pod specifications conform to a new model that allows the operator to specify a VPN in the network attachment definition and to configure the pod as a member of the VPN, along with a network interface specification. A pod 22 may have a different virtual network interface for each network to which it belongs. Network controller 24 processes the request to generate interface configuration data for a virtual network interface 26 for the pod 22A. Interface configuration data may include a container or pod unique identifier and a list or other data structure specifying, for each of the virtual network interfaces, network configuration data for configuring the virtual network interface. Network configuration data for a virtual network interface may include a network name, assigned virtual network address, MAC address, and/or domain name server values. An example of interface configuration data in JavaScript Object Notation (JSON) format is below.

Network controller 24 sends interface configuration data to server 12A and, more specifically in some cases, to virtual router 21A. To configure a virtual network interface for pod 22A, orchestrator 23 may invoke CNI 17A. CNI 17A obtains the interface configuration data from virtual router 21A and processes it. CNI 17A creates each virtual network interface specified in the interface configuration data. For example, CNI 17A may attach one end of a veth pair implementing a virtual network interface 26 to virtual router 21A and may attach the other end of the same veth pair to pod 22A, which may implement it using virtio-user.

The following is example interface configuration data for pod 22A for a virtual network interface 26.

```
[{
    // virtual network interface 26
    "id": "fe4bab62-a716-11e8-abd5-0cc47a698428",
    "instance-id": "fe3edca5-a716-11e8-822c-0cc47a698428",
    "ip-address": "10.47.255.250",
    "plen": 12,
    "vn-id": "56dda39c-5e99-4a28-855e-6ce378982888",
    "vm-project-id": "00000000-0000-0000-0000-000000000000",
    "mac-address": "02:fe:4b:ab:62:a7",
    "system-name": "tapeth0fe3edca",
    "rx-vlan-id": 65535,
    "tx-vlan-id": 65535,
    "vhostuser-mode": 0,
    "v6-ip-address": "::",
    "v6-plen": ,
    "v6-dns-server": "::",
    "v6-gateway": "::",
    "dns-server": "10.47.255.253",
    "gateway": "10.47.255.254",
    "author": "/usr/bin/contrail-vrouter-agent",
    "time": "426404:56:19.863169"
}]
```

Figure 2:
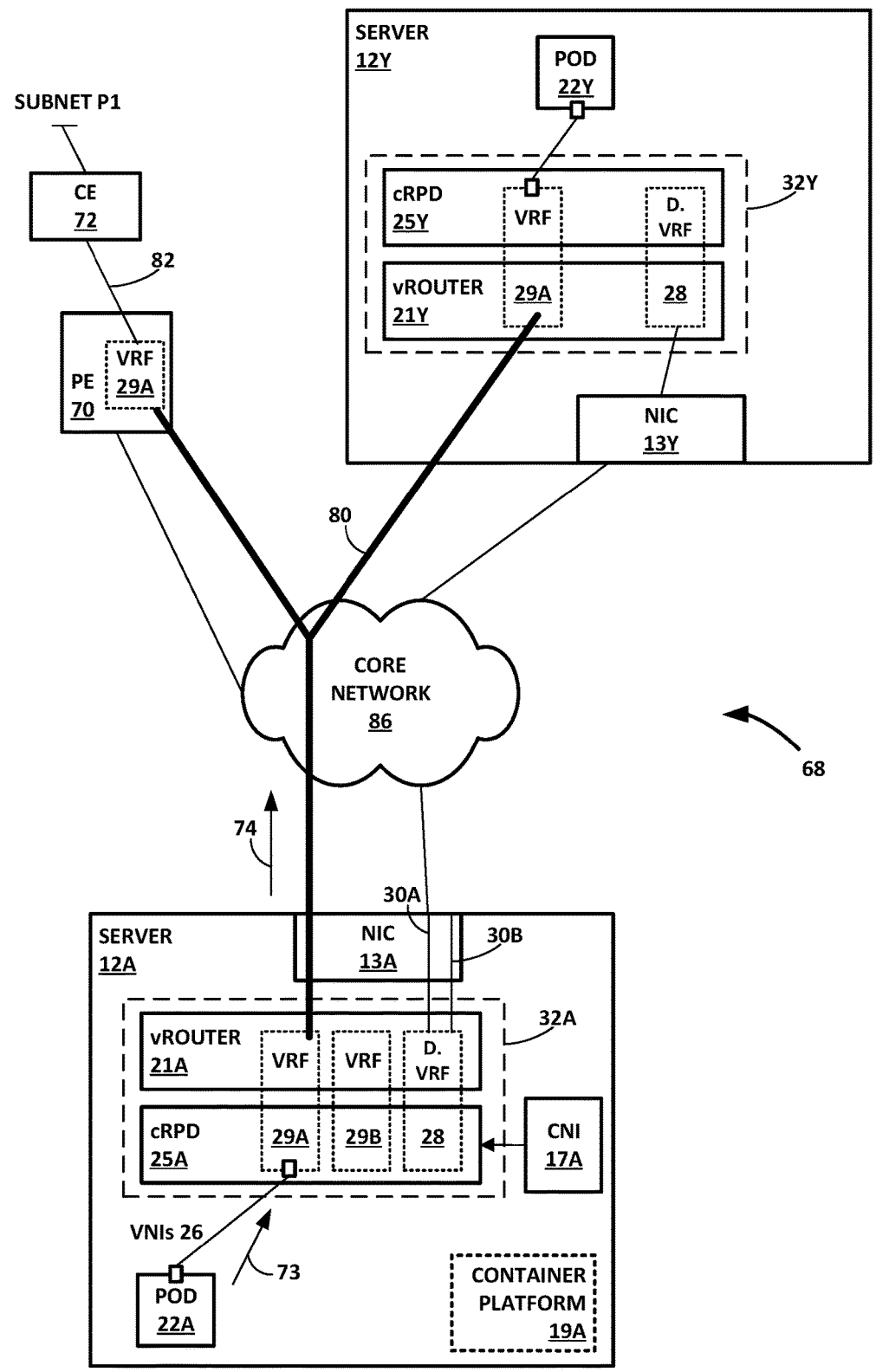
FIG. 2 is a block diagram of an example system that implements a VPN using a virtualized router having a containerized routing protocol process, in accordance with techniques of this disclosure.

FIG. 2 is a block diagram of an example system that implements a VPN using a virtualized router having a containerized routing protocol process, in accordance with techniques of this disclosure. System 68 include core network 86. Core network 86 is a layer 3 network and may include one or more switches and P (core) routers. Core network 86 may represent any combination of switch fabric 14, IP fabric 20, service provider network 7, public network 15, the Internet, or a separate layer 3 network. Core network 86 also includes physical PE router 70. A CE device 72 offers reachability to a customer network having network subnet P1.

Server 12A is configured similarly as in FIG. 1 but is illustrated with Pod 22A only for simplicity. Virtualized routers 32A, 32Y have default VRFs 28 with their respective host network interfaces.

PE router 70, virtualized router 32A, and virtualized router 32Y are configured with VRFs 29A to implement VPN 80 over core network 86. VPN 80 may represent an L3VPN, an EVPN, or another VPN operable over a layer 3 network and using routing protocol to advertise VPN routes. PE router 70, cRPD 25A, and cRPD 25Y negotiate tunnels to form an overlay network for VPN 86.

In accordance with techniques of this disclosure, virtual network interface 26 has one end terminated by pod 22A and another end terminated by VRF 29A. In some examples, cRPD 25A and pod 22A may execute one or more routing protocols to exchange "customer routes," i.e., routes to devices that are pod 22A or are reachable via pod 22A operating as a CE router or gateway. Routing protocol message 73 includes a route, which may specify an IP prefix for reachable destinations and/or specify an IP address assigned to pod 22A as a next hop or as a destination. Routing protocol message 73 may confirm to an interior gateway protocol, such as BGP, Intermediate System to Intermediate System (IS-IS), or Open Shortest Path First (OSPF). cRPD 25A receives routing protocol message 73 and imports the route into VRF 29A. cRPD 25A then advertises the route as a VPN route for the pod 22A in routing protocol message 74. Routing protocol message 74 may be a MP-BGP message that includes the VPN route as NLRI. The IP address for pod 22A that is advertised may be a VPN-IPv4 address, for example.

PE router 70 and cRPD 25Y receive copies of routing protocol message 73 and import the VPN route to their corresponding VRF 29A. Using the VPN route, both virtualized router 32Y and PE router 70 may send overlay network packets toward pod 22A via VPN 80. Virtualized router 32A receives such packets, identifies VRF 29A based on the tunnel header information (e.g., MPLS label) in the packets, and forwards the inner packet on to the virtual network interface 26 having the IP address assigned for pod 22A. Pod 22A receives the inner packet.

In some examples, virtualized router 32A implements an EVPN instance and performs data plane learning to learn MAC addresses of devices connected via virtual network interface 26. These may be advertised across core network 86 by cRPD 25A in a routing protocol message 74 that includes an EVPN route, e.g., Type-2 or Type-5. Such MAC addresses can include a MAC address for Pod 22A, as well as any other devices that are reachable via Pod 22A where Pod 22A is operating similarly to a CE device. In such examples, virtual network interface 26 is effectively an Ethernet Segment for the EVPN instance. Thereafter, virtualized router 32 may receive traffic on core-facing interface, the traffic destined for any of these MAC addresses, and forward such traffic to Pod 22 via virtual network interface 26.

Figure 3:
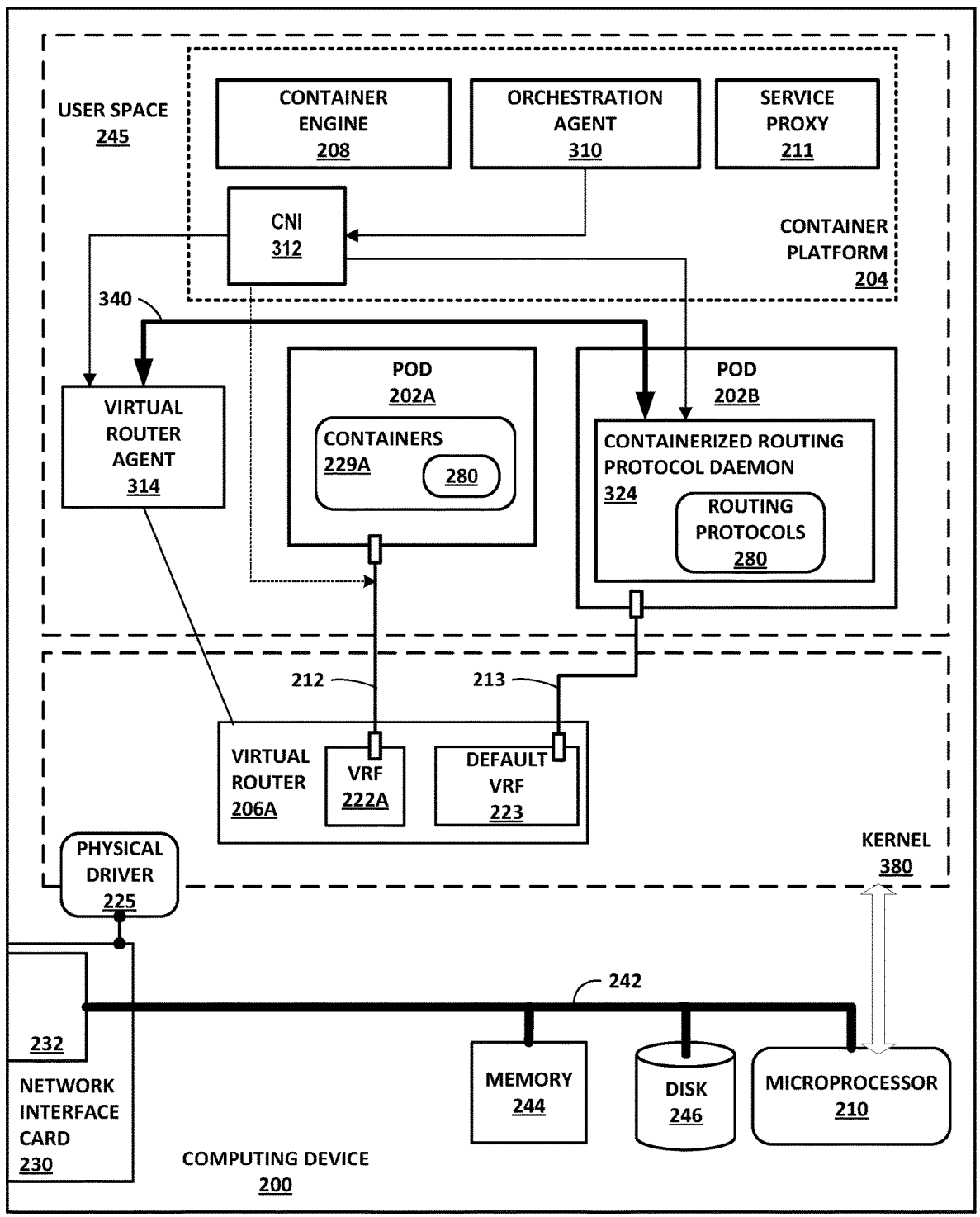
FIG. 3 is a block diagram of an example computing device, according to techniques described in this disclosure.

FIG. 3 is a block diagram of an example computing device (e.g., host), according to techniques described in this disclosure. Computing device 200 may represent a real or virtual server and may represent an example instance of any of servers 12 of FIG. 1. Computing device 200 includes in this example, a bus 242 coupling hardware components of a computing device 200 hardware environment. Bus 242 couples network interface card (NIC) 230, storage disk 246, and one or more microprocessors 210 (hereinafter, "microprocessor 210"). NIC 230 may be SR-IOV-capable. A frontside bus may in some cases couple microprocessor 210 and memory device 244. In some examples, bus 242 may couple memory device 244, microprocessor 210, and NIC 230. Bus 242 may represent a Peripheral Component Interface (PCI) express (PCIe) bus. In some examples, a direct memory access (DMA) controller may control DMA transfers among components coupled to bus 242. In some examples, components coupled to bus 242 control DMA transfers among components coupled to bus 242.

Microprocessor 210 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 246 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 210.

Main memory 244 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 244 provides a physical address space composed of addressable memory locations.

Network interface card (NIC) 230 includes one or more interfaces 232 configured to exchange packets using links of an underlying physical network. Interfaces 232 may include a port interface card having one or more network ports. NIC 230 may also include an on-card memory to, e.g., store packet data. Direct memory access transfers between the NIC 230 and other devices coupled to bus 242 may read/write from/to the NIC memory.

Memory 244, NIC 230, storage disk 246, and microprocessor 210 may provide an operating environment for a software stack that includes an operating system kernel 380 executing in kernel space. Kernel 380 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 380 provides an execution environment for one or more processes in user space 245.

Kernel 380 includes a physical driver 225 to use the network interface card 230. Network interface card 230 may also implement SR-IOV to enable sharing the physical network function (I/O) among one or more virtual execution elements, such as containers 229A or one or more virtual machines (not shown in FIG. 3). Shared virtual devices such as virtual functions may provide dedicated resources such that each of the virtual execution elements may access dedicated resources of NIC 230, which therefore appears to each of the virtual execution elements as a dedicated NIC. Virtual functions may represent lightweight PCIe functions that share physical resources with a physical function used by physical driver 225 and with other virtual functions. For an SR-IOV-capable NIC 230, NIC 230 may have thousands of available virtual functions according to the SR-IOV standard, but for I/O-intensive applications the number of configured virtual functions is typically much smaller.

Computing device 200 may be coupled to a physical network switch fabric that includes an overlay network that extends switch fabric from physical switches to software or "virtual" routers of physical servers coupled to the switch fabric, including virtual router 206A. Virtual routers may be processes or threads, or a component thereof, executed by the physical servers, e.g., servers 12 of FIG. 1, that dynamically create and manage one or more virtual networks usable for communication between virtual network endpoints. In one example, virtual routers implement each virtual network using an overlay network, which provides the capability to decouple an endpoint's virtual address from a physical address (e.g., IP address) of the server on which the endpoint is executing. Each virtual network may use its own addressing and security scheme and may be viewed as orthogonal from the physical network and its addressing scheme. Various techniques may be used to transport packets within and across virtual networks over the physical network. The term "virtual router" as used herein may encompass an Open vSwitch (OVS), an OVS bridge, a Linux bridge, Docker bridge, or other device and/or software that is located on a host device and performs switching, bridging, or routing packets among virtual network endpoints of one or more virtual networks, where the virtual network endpoints are hosted by one or more of servers 12. In the example computing device 200 of FIG. 2, virtual router 206A executes within kernel 380, but in some instances virtual router 206A may execute in user space as a DPDK-based virtual router, within a hypervisor, a host operating system, a host application, or a virtual machine.

Virtual router 206A may replace and subsume the virtual routing/bridging functionality of the Linux bridge/OVS module that is commonly used for Kubernetes deployments of pods 202A-202B (collectively, "pods 202"). Virtual router 206A may perform bridging (e.g., E-VPN) and routing (e.g., L3VPN, IP-VPNs) for virtual networks. Virtual router 206A may perform networking services such as applying security policies, NAT, multicast, mirroring, and load balancing.

Virtual router 206A can be executing as a kernel module or as a user space DPDK process (virtual router 206A is shown here in kernel 380). Virtual router agent 314 may also be executing in user space. Virtual router agent 314 has a connection to network controller 24 using a channel, which is used to download configurations and forwarding information. Virtual router agent 314 programs this forwarding state to the virtual router data (or "forwarding") plane represented by virtual router 206A. Virtual router 206A and virtual router agent 314 may be processes.

Virtual router 206A may be multi-threaded and execute on one or more processor cores. Virtual router 206A may include multiple queues. Virtual router 206A may implement a packet processing pipeline. The pipeline can be stitched by the virtual router agent 314 from the simplest to the most complicated manner depending on the operations to be applied to a packet. Virtual router 206A may maintain multiple instances of forwarding bases. Virtual router 206A may access and update tables using RCU (Read Copy Update) locks.

To send packets to other compute nodes or switches, virtual router 206A uses one or more physical interfaces 232. In general, virtual router 206A exchanges overlay packets with workloads, such as VMs or pods 202 (in FIG. 3). Virtual router 206A may have multiple virtual network interfaces (e.g., vifs). These interfaces may include the kernel interface, vhost0, for exchanging packets with the host operating system; an interface with virtual router agent 314, pkt0, to obtain forwarding state from the network controller and to send up exception packets. There may be one or more virtual network interfaces corresponding to the one or more physical network interfaces 232.

Other virtual network interfaces of virtual router 206A are for exchanging packets with the workloads. Virtual network interfaces 212, 213 of virtual router 206A are illustrated in FIG. 3. Virtual network interfaces 212, 213 may be any of the aforementioned types of virtual interfaces. In some cases, virtual network interfaces 212, 213 are tap interfaces.

cRPD 324 may represent an example instance of cRPD 25A of FIG. 1. CRPD 324 is brought up to operate in host network mode. Virtual network interface 213 attached to default VRF 223 of virtual router 206A provides cRPD 324 with access to the host network interfaces of computing device. Pod 202B may therefore have a host IP address of computing device 200 on the underlay network.

Pod 202B may be assigned its own virtual layer three (L3) IP address for sending and receiving communications but may be unaware of an IP address of the computing device 200 on which the pod 202B executes. The virtual L3 (network) address may thus differ from the logical address for the underlying, physical computer system, e.g., computing device 200. The virtual network address may be specified in a pod specification or selected by a network controller 24 from a pool of addresses for a VPN.

Computing device 200 includes a virtual router agent 314 that controls the overlay of virtual networks for computing device 200 and that coordinates the routing of data packets within computing device 200. In general, virtual router agent 314 communicates with network controller 24 for the virtualization infrastructure, which generates commands to create virtual networks and configure network virtualization endpoints, such as computing device 200 and, more specifically, virtual router 206A, as a well as virtual network interface 212. By configuring virtual router 206A based on information received from network controller 24, virtual router agent 314 may support configuring network isolation, policy-based security, a gateway, source network address translation (SNAT), a load-balancer, and service chaining capability for orchestration.

In one example, network packets, e.g., layer three (L3) IP packets or layer two (L2) Ethernet packets generated or consumed by the containers 229A within the virtual network domain may be encapsulated in another packet (e.g., another IP or Ethernet packet) that is transported by the physical network. The packet transported in a virtual network may be referred to herein as an "inner packet" while the physical network packet may be referred to herein as an "outer packet" or a "tunnel packet." Encapsulation and/or de-capsulation of virtual network packets within physical network packets may be performed by virtual router 206A. This functionality is referred to herein as tunneling and may be used to create one or more overlay networks. Besides IPinIP, other example tunneling protocols that may be used include IP over Generic Route Encapsulation (GRE), VxLAN, Multiprotocol Label Switching (MPLS) over GRE, MPLS over User Datagram Protocol (UDP), etc. Virtual router 206A performs tunnel encapsulation/decapsulation for packets sourced by/destined to any containers of pods 202, and virtual router 206A exchanges packets with pods 202 via bus 242 and/or a bridge of NIC 230.

As noted above, a network controller 24 may provide a logically centralized controller for facilitating operation of one or more virtual networks. The network controller 24 may, for example, maintain a routing information base, e.g., one or more routing tables that store routing information for the physical network as well as one or more overlay networks. Virtual router 206A implements virtual routing and forwarding instances (VRFs) 222A for a VPN for which virtual router 206A operates as a tunnel endpoints. In general, a VRF stores forwarding information for the corresponding virtual network and identifies where data packets are to be forwarded and whether the packets are to be encapsulated in a tunneling protocol, such as with a tunnel header that may include one or more headers for different layers of the virtual network protocol stack. A VRF may include a network forwarding table storing routing and forwarding information for the virtual network.

NIC 230 may receive tunnel packets. Virtual router 206A processes the tunnel packet to determine, from the tunnel encapsulation header, the virtual network of the source and destination endpoints for the inner packet. Virtual router 206A may strip the layer 2 header and the tunnel encapsulation header to internally forward only the inner packet. The tunnel encapsulation header may include a virtual network identifier, such as a VxLAN tag or MPLS label, that indicates a virtual network, e.g., a virtual network corresponding to VRF 222A. VRF 222A may include forwarding information for the inner packet. For instance, VRF 222A may map a destination layer 3 address for the inner packet to virtual network interface 212. VRF 222A forwards the inner packet via virtual network interface 212 to POD 202A in response.

Containers 229A may also source inner packets as source virtual network endpoints. Container 229A, for instance, may generate a layer 3 inner packet destined for a destination virtual network endpoint that is executed by another computing device (i.e., not computing device 200) or for another one of containers. Container 229A may sends the layer 3 inner packet to virtual router 206A via virtual network interface 212 attached to VRF 222A.

Virtual router 206A receives the inner packet and layer 2 header and determines a virtual network for the inner packet. Virtual router 206A may determine the virtual network using any of the above-described virtual network interface implementation techniques (e.g., macvlan, veth, etc.). Virtual router 206A uses the VRF 222A corresponding to the virtual network for the inner packet to generate an outer header for the inner packet, the outer header including an outer IP header for the overlay tunnel and a tunnel encapsulation header identifying the virtual network. Virtual router 206A encapsulates the inner packet with the outer header. Virtual router 206A may encapsulate the tunnel packet with a new layer 2 header having a destination layer 2 address associated with a device external to the computing device 200, e.g., a TOR switch 16 or one of servers 12. If external to computing device 200, virtual router 206A outputs the tunnel packet with the new layer 2 header to NIC 230 using physical function 221. NIC 230 outputs the packet on an outbound interface. If the destination is another virtual network endpoint executing on computing device 200, virtual router 206A routes the packet to the appropriate one of virtual network interfaces 212, 213.

In some examples, a controller for computing device 200 (e.g., network controller 24 of FIG. 1) configures a default route in each of pods 202 to cause the virtual machines 224 to use virtual router 206A as an initial next hop for outbound packets. In some examples, NIC 230 is configured with one or more forwarding rules to cause all packets received from virtual machines 224 to be switched to virtual router 206A.

Pod 202A includes one or more application containers 229A. Pod 202B includes an instance of cRPD 324. Container platform 204 includes container runtime 208, orchestration agent 310, service proxy 211, and CNI 312.

Container engine 208 includes code executable by microprocessor 210. Container runtime 208 may be one or more computer processes. Container engine 208 runs containerized applications in the form of containers 229A. Container engine 208 may represent a Dockert, rkt, or other container engine for managing containers. In general, container engine 208 receives requests and manages objects such as images, containers, networks, and volumes. An image is a template with instructions for creating a container. A container is an executable instance of an image. Based on directives from controller agent 310, container engine 208 may obtain images and instantiate them as executable containers in pods 202A-202B.

Service proxy 211 includes code executable by microprocessor 210. Service proxy 211 may be one or more computer processes. Service proxy 211 monitors for the addition and removal of service and endpoints objects, and it maintains the network configuration of the computing device 200 to ensure communication among pods and containers, e.g., using services. Service proxy 211 may also manage iptables to capture traffic to a service's virtual IP address and port and redirect the traffic to the proxy port that proxies a backed pod. Service proxy 211 may represent a kube-proxy for a minion node of a Kubernetes cluster. In some examples, container platform 204 does not include a service proxy 211 or the service proxy 211 is disabled in favor of configuration of virtual router 206A and pods 202 by CNI 312.

Orchestration agent 310 includes code executable by microprocessor 210. Orchestration agent 310 may be one or more computer processes. Orchestration agent 310 may represent a kubelet for a minion node of a Kubernetes cluster. Orchestration agent 310 is an agent of an orchestrator, e.g., orchestrator 23 of FIG. 1, that receives container specification data for containers and ensures the containers execute by computing device 200. Container specification data may be in the form of a manifest file sent to orchestration agent 310 from orchestrator 23 or indirectly received via a command line interface, HTTP endpoint, or HTTP server. Container specification data may be a pod specification (e.g., a PodSpec—a YAML (Yet Another Markup Language) or JSON object that describes a pod) for one of pods 202 of containers 229. Based on the container specification data, orchestration agent 310 directs container engine 208 to obtain and instantiate the container images for containers 229, for execution of containers 229 by computing device 200.

Orchestration agent 310 instantiates or otherwise invokes CNI 312 to configure one or more virtual network interfaces for each of pods 202. For example, orchestration agent 310 receives a container specification data for pod 202A and directs container engine 208 to create the pod 202A with containers 229A based on the container specification data for pod 202A. Orchestration agent 310 also invokes the CNI 312 to configure, for pod 202A, virtual network interface 212 for a virtual network corresponding to VRFs 222A. In this example, pod 202A is a virtual network endpoint for a virtual network corresponding to VRF 222A.

CNI 312 may obtain interface configuration data for configuring virtual network interfaces for pods 202. Virtual router agent 314 operates as a virtual network control plane module for enabling network controller 24 to configure virtual router 206A. Unlike the orchestration control plane (including the container platforms 204 for minion nodes and the master node(s), e.g., orchestrator 23), which manages the provisioning, scheduling, and managing virtual execution elements, a virtual network control plane (including network controller 24 and virtual router agent 314 for minion nodes) manages the configuration of virtual networks implemented in the data plane in part by virtual routers 206A of the minion nodes. Virtual router agent 314 communicates, to CNI 312, interface configuration data for virtual network interfaces to enable an orchestration control plane element (i.e., CNI 312) to configure the virtual network interfaces according to the configuration state determined by the network controller 24, thus bridging the gap between the orchestration control plane and virtual network control plane. In addition, this may enable a CNI 312 to obtain interface configuration data for multiple virtual network interfaces for a pod and configure the multiple virtual network interfaces, which may reduce communication and resource overhead inherent with invoking a separate CNI 312 for configuring each virtual network interface.

In accordance with techniques of this disclosure, network controller 24 via virtual agent 314 configures VRF 222A for a VPN. Containers 229 and cRPD 324 execute one or more routing protocols 280. Containers 229 and cRPD 324 may be routing protocol peers for routing protocols 280. Routing protocols 280 may include a interior gateway protocol, such as OSPF, IS-IS, Routing Information Protocol (RIP), Interior BGP (IBGP), or another protocol. Containers 229A may advertise a route for the IP address assigned to containers 229A (here, the shared the IP address assigned to pod 202B) using routing protocol messages of one of routing protocols 280. For example, such messages may be OSPF Link-State Advertisements, an RIP response message, a BGP UPDATE message, or other routing protocol message that advertises a route to the IP address assigned to containers 229A. Virtual router 206A forwards the routing protocol messages received at VRF 222A to cRPD 324.

CRPD 324 processes the routing protocol messages advertising a route for the IP address assigned to containers 229A and imports the IP address to VRF 222A as a VPN-IPv4 address. CRPD 324 then advertises itself as a next-hop for the VPN-IPv4 address in a routing protocol message sent to other PE routers. For example, cRPD 324 may output a MP-BGP UPDATE message that specifies its IP address (also the host IP address) as the next hop for the VPN-IPv4 address. Other PE routers receive this routing protocol message and update their respective VRFs for the VPN to forward VPN traffic destinated for containers 229A toward computing device 200 (and cRPD 324). Because cRPD 324 is operating in host network mode, a particular TCP/UDP port may be allocated to cRPD 324 for its communications.

In this way, containers 229A and cRPD 324 model the familiar PE-CE VPN service model for service provider networks and can extend the overlay network to the containers 229A. Because cRPD 324 uses standard routing protocols and VPNs, this model is compatible with physical PE routers that also use these standards, which provides a technical advantage over existing CNIs for configuring networking for containers in a virtualized computing infrastructure.

CNI 312 may program cRPD 324 via a management interface of cRPD 324. In some examples, the orchestrator pushes to CNI 312 (via orchestration agent 310) an initial configuration template as a ConfigMap. The ConfigMap may be a Kubernetes ConfigMap.

When Pod 202B including cRPD 324 is brought up, CNI 312 (which deploys Pod 202B) operates also as a controller to processes the initial configuration template and generates configuration data for the cRPD 324. The configuration data may conform to a management interface format, e.g., Netconf, CLI, or proprietary.

The purpose of the configuration template is to allow a user/operator to provide an easy way to customize the configuration to suite their network needs (for example, the particular IPG to use, which BGP families should be enabled, policy configuration, and the like). CNI 312 replaces variables in the initial configuration template with values specific to computing device 200 (e.g., loopback address, IS-IS address, SR node index, etc.), making it possible for the user/operator to define a common configuration template that can be applied to instances of cRPD 324 running on multiple nodes in the cluster.

In addition, a controller may listens on events to monitor updates to this ConfigMap and update the base configuration during runtime without having to restart/redeploy cRPD 324 and virtual router 206A, which could cause traffic disruption.

The advantage of using a template over Custom Resource Definitions (CRDs) is that, given the large number of configuration parameters supported cRPD 324, the CRD object definitions may become unwieldy and difficult to develop, and building corresponding software logic to process those objects is time-consuming. This can limit the set of models using CRD and needs software changes as when new features/network models. (For example, the addition of Segment Routing not defined by existing CRDs.) Some of the configurable features, such as routing policies would take significant amount of effort to express as CRD and software. A CRD-based approach would simply replicate the same CLI knobs that are already present in cRPD 324, though in a different format (e.g., json, yaml, Netconf, openconfig, yang) and without much benefit. The template based approach provides access to all the CLI knobs with comparatively little need to update software and or development effort. An example initial configuration template, with variables and some logic, is as follows:

```
apiVersion: v1
kind: ConfigMap
metadata:
  name: jcnr-config #configuring the containerized network router (cRPD as control plane)
  namespace: kube-system
data:
  # cRPD base config loaded during CNI installation
  crpd-config.tmpl: |
    # Initialize variables
    # Default to using node IP address loopback address
    # unless overriden via configmap or environment variable
    # Also, default to using node IP for setting up BGP sessions
    {{$IPv4LoopbackAddr := .NodeIP}}
    {{if .IPv4LoopbackAddr}}
       {{$IPv4LoopbackAddr = .IPv4LoopbackAddr}}
    {{end}}
    {{$IPv6LoopbackAddr := .NodeIPv6}}
    {{if .IPv6LoopbackAddr}}
```

```
    {{$IPv6LoopbackAddr = .IPv6LoopbackAddr}}
{{end}}
{{$BGPIPv4Neighbor := .MasterNodeIP}}
{{if .BGPIPv4Neighbor}}
    {{$BGPIPv4Neighbor = .BGPIPv4Neighbor}}
{{end}}
{{$BGPIPv6Neighbor := ""}}
{{if .BGPIPv6Neighbor}}
    {{$BGPIPv6Neighbor = .BGPIPv6Neighbor}}
{{end}}
groups {
  base {
      apply-flags omit;
      apply-macro ht {
        jcnr;
      }
      system {
        root-authentication {
           encrypted-password "{{.EncryptedPassword}}"; ## SECRET-DATA
        }
        {{if .LicenseKey}}
        license {
          keys {
            key "{{.LicenseKey}}";
          }
        }
        {{end}}
        {{if .BGPListenPort}}
        processes {
            routing {
                bgp tcp-listen-port {{.BGPListenPort}};
            }
        }
        {{end}}
      }
      interfaces {
        lo0 {
          unit 0 {
                  {{if .ISOLoopbackAddr}}
              family iso {
                address {{.ISOLoopbackAddr}};
              }
                  {{end}}
              family inet {
                address {{$IPv4LoopbackAddr}};
              }
              {{if $IPv6LoopbackAddr}}
              family inet6 {
                address {{$IPv6LoopbackAddr}};
              }
              {{end}}
          }
        }
      }
      routing-options {
        router-id {{$IPv4LoopbackAddr}}
        route-distinguisher-id {{$IPv4LoopbackAddr}}
        {{if .IPv4DefaultGw}}
        static {
          route 0.0.0.0/0 next-hop {{.IPv4DefaultGw}};
        }
        {{end}}
        forwarding-table {
          export no-install;
          channel vrouter {
             protocol {
                protocol-type gRPC;
                destination 127.0.0.1:50052;
             }
          }
        }
      }
      protocols {
        ospf {
          area 0.0.0.0 {
            interface all;
            interface lo.0 {
              passive;
            }
```

```
                }
            }
            isis {
                interface all;
                {{if and .SRGBStartLabel .SRGBIndexRange}}
                source-packet-routing {
                    srgb start-label {{.SRGBStartLabel}} index-range {{.SRGBIndexRange}};
                    node-segment {
                        {{if .SRIPv4NodeIndex}}
                        ipv4-index {{.SRIPv4NodeIndex}};
                        {{end}}
                        {{if .SRIPv6NodeIndex}}
                        ipv6-index {{.SRIPv6NodeIndex}};
                        {{end}}
                    }
                }
                {{end}}
                level 1 disable;
            }
            ldp {
                interface all;
            }
            mpls {
                interface all;
            }
        }
        policy-options {
            # policy to signal dynamic GRE tunnel attributes to BGP routes
            policy-statement gre-export {
                then community add gre;
            }
            # policy to signal dynamic IPIP tunnel attributes to BGP routes
            policy-statement ipip-export {
                then community add ipip;
            }
            # policy to signal dynamic UDP tunnel attributes to BGP routes
            policy-statement udp-export {
                then community add udp;
            }
            community gre members encapsulation:0L:11;
            community ipip members encapsulation:0L:7;
            community udp members encapsulation:0L:13;
            policy-statement no-install {
                from {
                    route-filter 0.0.0.0/0 exact;
                }
                then reject;
            }
        }
        {{if .IsMasterNode}}
        protocols {
            bgp {
                # Configure RR on master-node if the neighbor address matches local
                # (loopback or node) address
                {{if $BGPIPv4Neighbor}}
                {{if or (eq $BGPIPv4Neighbor .NodeIP) (eq $BGPIPv4Neighbor $IPv4LoopbackAddr)}}
                group CNI {
                    {{if .BGPConnectPort}}
                    tcp-connect-port {{.BGPConnectPort}};
                    {{end}}
                    type internal;
                    local-address {{$BGPIPv4Neighbor}};
                    cluster {{$IPv4LoopbackAddr}};
                    local-as {{.LocalAS}};
                    allow 0.0.0.0/0;
                    family inet-vpn {
                        unicast;
                    }
                    family inet6-vpn {
                        unicast;
                    }
                    family evpn {
                        signaling;
                    }
                }
                {{end}}
                {{end}}
```

```
            {{if and $BGPIPv6Neighbor $IPv4LoopbackAddr}}
            {{if or (eq $BGPIPv6Neighbor .NodeIPv6) (eq $BGPIPv6Neighbor
$IPv6LoopbackAddr)}}
                 group CNIv6 {
                     {{if .BGPConnectPort}}
                     tcp-connect-port {{.BGPConnectPort}};
                     {{end}}
                     type internal;
                     local-address {{$BGPIPv6Neighbor}};
                     cluster {{$IPv4LoopbackAddr}};
                     local-as {{.LocalAS}};
                     allow ::/0;
                     family inet-vpn {
                       unicast extended-nexthop;
                     }
                     family inet6-vpn {
                       unicast;
                     }
                     family evpn {
                       signaling;
                     }
                 }
                 {{end}}
                 {{end}}
             }
         }
         routing-options {
            # Activate if using dynamic IP based tunnels for resolving next-hops
            inactive: resolution {
               rib bgp.l3vpn.0 {
                  resolution-ribs inet.0;
               }
            }
         }
    }
    {{else}}
    protocols {
       bgp {
          {{if $BGPIPv4Neighbor}}
          group CNI {
             type internal;
             inactive: vpn-apply-export;
             inactive: export udp-export;
             local-address {{$IPv4LoopbackAddr}};
             local-as {{.LocalAS}};
             neighbor {{$BGPIPv4Neighbor}};
             family inet-vpn {
                unicast;
             }
             family inet6-vpn {
                unicast;
             }
             family evpn {
                signaling;
             }
          }
          {{end}}
          {{if and $BGPIPv6Neighbor $IPv6LoopbackAddr}}
          group CNIv6 {
             type internal;
             local-address {{$IPv6LoopbackAddr}};
             local-as {{.LocalAS}};
             neighbor {{$BGPIPv6Neighbor}};
             family inet-vpn {
                unicast extended-nexthop;
             }
             family inet6-vpn {
                unicast;
             }
             family evpn {
                signaling;
             }
          }
          {{end}}
       }
    }
    routing-options {
         inactive: dynamic-tunnels {
         inactive: gre next-hop-based-tunnel;
         dyn-tunnels {
```

```
            source-address {{$IPv4LoopbackAddr}};
            udp;
            destination-networks {
              # Try to setup dynamic tunnels with any peer
              # Replace with more specifc prefix ranges(s)
              0.0.0.0/0;
            }
          }
        }
      }
    }
    {{end}}
  }
  {{if not .IsMasterNode}}
  evpn-type5 {
    apply-flags omit;
    apply-macro ht {
      jcnr;
    }
    routing-instances {
      <*> {
        vrf-table-label;
        protocols {
          evpn {
            ip-prefix-routes {
              advertise direct-nexthop;
            }
          }
        }
      }
    }
  }
  {{end}}
  {{if not .IsMasterNode}}
  evpn-mac-vrf {
    apply-flags omit;
    apply-macro ht {
      jcnr;
    }
    routing-instances {
      <*> {
        vtep-source-interface lo.0;
        protocols {
          evpn {
            default-gateway do-not-advertise;
          }
        }
      }
    }
  }
  {{end}}
}
```

Figure 4:
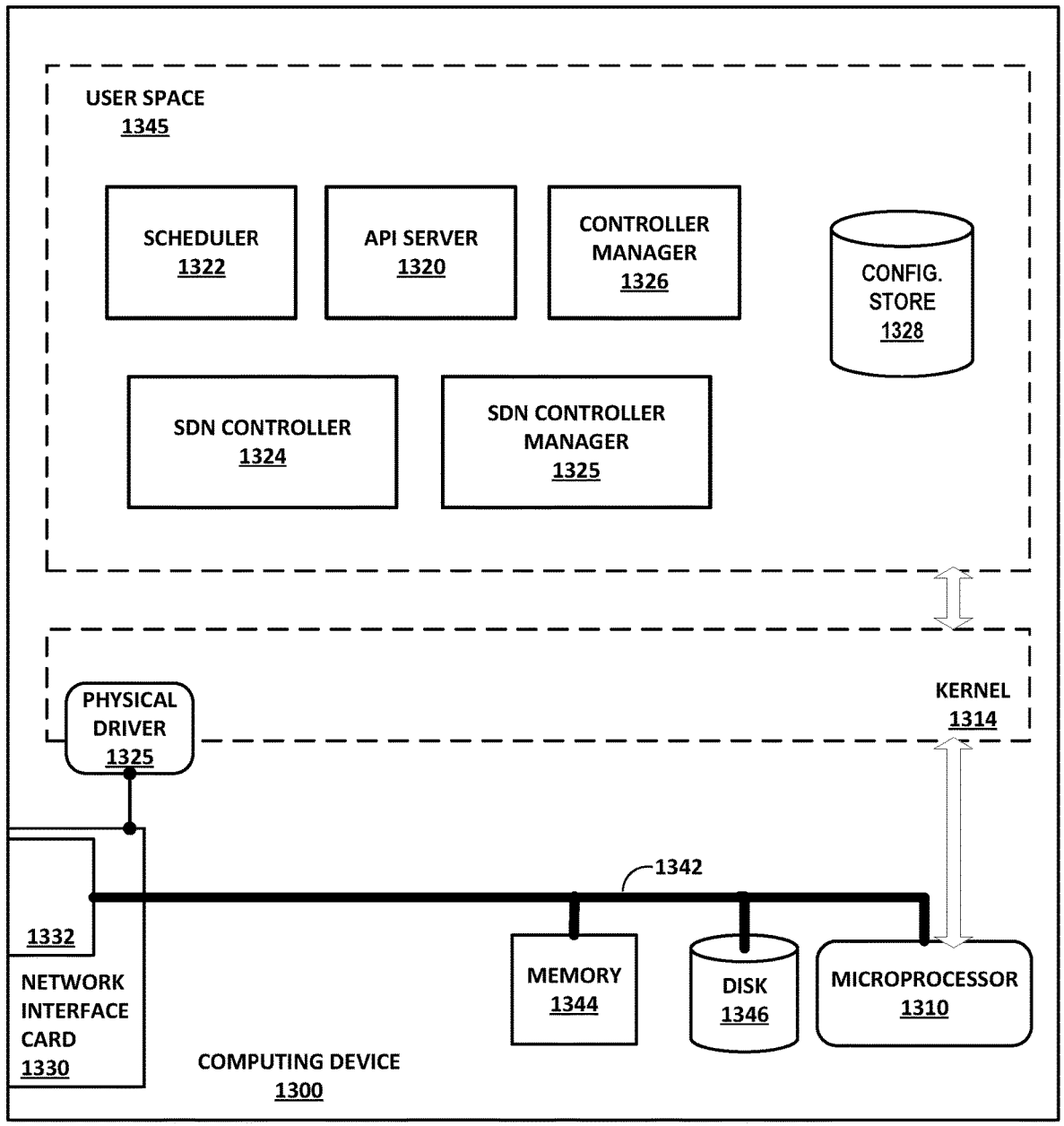
FIG. 4 is a block diagram of an example computing device operating as an instance of an orchestrator master node for a cluster for a virtualized computing infrastructure, according to techniques described in this disclosure.

FIG. 4 is a block diagram of an example computing device operating as an instance of an orchestrator master node for a cluster for a virtualized computing infrastructure, according to techniques of this disclosure. Computing device 1300 of FIG. 4 may represent one or more real or virtual servers. As such, computing device 1300 may in some instances implement one or more master nodes for respective clusters.

Scheduler 1322, API server 1320, network controller manager 1326, SDN controller 1324, SDN controller manager 1325, and configuration store 1328, although illustrated and described as being executed by a single computing device 1300, may be distributed among multiple computing devices 300 that make up a computing system or hardware/ server cluster. Each of the multiple computing devices 1300, in other words, may provide a hardware operating environment for one or more instances of any one or more of scheduler 1322, API server 1320, network controller manager 1326, SDN controller 1324, SDN controller manager 1325, or configuration store 1328. SDN controller 1324 may represent an example instance of network controller 24 of FIG. 1. Scheduler 1322, API server 1320, controller manager 1326, and SDN controller manager 1325 may implement an example instance of orchestrator 23. SDN controller manager 1325 may represent an example implementation of a Kubernetes cloud controller manager or Kube-manager.

Computing device 1300 includes in this example, a bus 1342 coupling hardware components of a computing device 1300 hardware environment. Bus 1342 couples network interface card (NIC) 1330, storage disk 1346, and one or more microprocessors 1310 (hereinafter, "microprocessor 1310"). A front-side bus may in some cases couple microprocessor 1310 and memory device 1344. In some examples, bus 1342 may couple memory device 1344, microprocessor 1310, and NIC 1330. Bus 1342 may represent a Peripheral Component Interface (PCI) express (PCIe) bus. In some examples, a direct memory access (DMA) controller may control DMA transfers among components coupled to bus 242. In some examples, components coupled to bus 1342 control DMA transfers among components coupled to bus 1342.

Microprocessor 1310 may include one or more processors each including an independent execution unit to perform instructions that conform to an instruction set architecture, the instructions stored to storage media. Execution units may be implemented as separate integrated circuits (ICs) or may be combined within one or more multi-core processors (or "many-core" processors) that are each implemented using a single IC (i.e., a chip multiprocessor).

Disk 1346 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, Flash memory, CD-ROM, digital versatile discs (DVD) or other optical storage, magnetic cassettes, magnetic tape, magnetic disk storage or other magnetic storage devices, or any other medium that can be used to store the desired information and that can be accessed by microprocessor 1310.

Main memory 1344 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 1344 provides a physical address space composed of addressable memory locations.

Network interface card (NIC) 1330 includes one or more interfaces 3132 configured to exchange packets using links of an underlying physical network. Interfaces 3132 may include a port interface card having one or more network ports. NIC 1330 may also include an on-card memory to, e.g., store packet data. Direct memory access transfers between the NIC 1330 and other devices coupled to bus 1342 may read/write from/to the NIC memory.

Memory 1344, NIC 1330, storage disk 1346, and microprocessor 1310 may provide an operating environment for a software stack that includes an operating system kernel 1314 executing in kernel space. Kernel 1314 may represent, for example, a Linux, Berkeley Software Distribution (BSD), another Unix-variant kernel, or a Windows server operating system kernel, available from Microsoft Corp. In some instances, the operating system may execute a hypervisor and one or more virtual machines managed by hypervisor. Example hypervisors include Kernel-based Virtual Machine (KVM) for the Linux kernel, Xen, ESXi available from VMware, Windows Hyper-V available from Microsoft, and other open-source and proprietary hypervisors. The term hypervisor can encompass a virtual machine manager (VMM). An operating system that includes kernel 1314 provides an execution environment for one or more processes in user space 1345. Kernel 1314 includes a physical driver 1325 to use the network interface card 230.

Computing device 1300 may be coupled to a physical network switch fabric that includes an overlay network that extends switch fabric from physical switches to software or "virtual" routers of physical servers coupled to the switch fabric, such virtual router 220 of FIG. 2. Computing device 1300 may use one or more dedicated virtual networks to configure minion nodes of a cluster.

API server 1320, scheduler 1322, controller manager 1326, and configuration store may implement a master node for a cluster and be alternatively referred to as "master components." The cluster may be a Kubernetes cluster and the master node a Kubernetes master node, in which case the master components are Kubernetes master components.

API server 1320 includes code executable by microprocessor 1310. API server 1320 may be one or more computer processes. API server 1320 validates and configures data for objects, such as virtual execution elements (e.g., pods of containers), services, and replication controllers, for instance. A service may be an abstraction that defines a logical set of pods and the policy used to access the pods. The set of pods implementing a service are selected based on the service definition. A service may be implemented in part as, or otherwise include, a load balancer. API server 1320 may implement a Representational State Transfer (REST) interface to process REST operations and provide the frontend to a corresponding cluster's shared state stored to configuration store 1328. API server 1320 may authenticate and authorize requests. API server 1320 communicates with other components to instantiate virtual execution elements in the computing infrastructure 8. API server 1320 may represent a Kubernetes API server.

Configuration store 1328 is a backing store for all cluster data. Cluster data may include cluster state and configuration data. Configuration data may also provide a backend for service discovery and/or provide a locking service. Configuration store 1328 may be implemented as a key value store. Configuration store 1328 may be a central database or distributed database. Configuration store 1328 may represent an etcd store. Configuration store 1328 may represent a Kubernetes configuration store.

Scheduler 1322 includes code executable by microprocessor 1310. Scheduler 1322 may be one or more computer processes. Scheduler 1322 monitors for newly created or requested virtual execution elements (e.g., pods of containers) and selects a minion node on which the virtual execution elements are to run. Scheduler 1322 may select a minion node based on resource requirements, hardware constraints, software constraints, policy constraints, locality, etc. Scheduler 1322 may represent a Kubernetes scheduler.

In general, API server 1320 may invoke the scheduler 1322 to schedule a virtual execution element, which may select a minion node and returns an identifier for the selected minion node to API server 1320, which may write the identifier to the configuration store 1328 in association with the virtual execution element. API server 1320 may invoke the orchestration agent 310 for the selected minion node, which may cause the container engine 208 for the selected minion node to obtain the virtual execution element from a storage server and create the virtual execution element on the minion node. The orchestration agent 310 for the selected minion node may update the status for the virtual execution element to the API server 1320, which persists this new state to the configuration store 1328. In this way, computing device 1300 instantiates new virtual execution elements in the computing infrastructure 8.

Controller manager 1326 includes code executable by microprocessor 1310. Controller manager 1326 may be one or more computer processes. Controller manager 1326 may embed the core control loops, monitoring a shared state of a cluster by obtaining notifications from API Server 1320. Controller manager 1326 may attempt to move the state of the cluster toward the desired state. Example controllers (not shown) managed by the controller manager 1326 may include a replication controller, endpoints controller, namespace controller, and service accounts controller. Controller manager 1326 may perform lifecycle functions such as namespace creation and lifecycle, event garbage collection, terminated pod garbage collection, cascading-deletion garbage collection, node garbage collection, etc. Controller manager 1326 may represent a Kubernetes Controller Manager for a Kubernetes cluster.

SDN controller 1324 includes code executable by microprocessor 1310. SDN controller 1324 may include one or more computer processes. SDN controller 1324 may represent an example instance of network controller 24 of FIG. 1. The SDN controller 1324 may be a logically centralized but physically distributed Software Defined Networking (SDN) controller that is responsible for providing the management, control, and analytics functions of a virtualized network. In particular, SDN controller 1324 may be a logically centralized control plane and management plane of the computing infrastructure 8 and orchestrates vRouters for one or more minion nodes.

SDN controller 1324 may provide cloud networking for a computing architecture operating over a network infrastructure. Cloud networking may include private clouds for enterprise or service providers, infrastructure as a service (IaaS), and virtual private clouds (VPCs) for cloud service providers (CSPs). The private cloud, VPC, and IaaS use cases may involve a multi-tenant virtualized data centers, such as that described with respect to FIG. 1. In such cases, multiple tenants in a data center share the same physical resources (physical servers, physical storage, physical network). Each tenant is assigned its own logical resources (virtual machines, containers, or other form of virtual execution elements; virtual storage; virtual networks). These logical resources are isolated from each other, unless specifically allowed by security policies. The virtual networks in the data center may also be interconnected to a physical IP VPN or L2 VPN.

SDN controller 1324 may provide network function virtualization (NFV) to networks, such as business edge networks, broadband subscriber management edge networks, and mobile edge networks. NFV involves orchestration and management of networking functions such as a Firewalls, Intrusion Detection or Preventions Systems (IDS/IPS), Deep Packet Inspection (DPI), caching, Wide Area Network (WAN) optimization, etc. in virtual machines, containers, or other virtual execution elements instead of on physical hardware appliances. The main drivers for virtualization of the networking services in this market are time to market and cost optimization.

SDN controller 1324 programs network infrastructure elements to create virtual networks and may create interface configurations for virtual network interfaces for the virtual networks.

Additional information regarding an example network controller is found in International Application Number PCT/US2013/044378 and in U.S. patent application Ser. No. 14/226,509, incorporated by reference above.

SDN controller manager 1325 includes code executable by microprocessor 1310. SDN controller manager 1325 may be one or more computer processes. SDN controller manager 1325 operates as an interface between the orchestration-oriented elements (e.g., scheduler 1322, API server 1320, controller manager 1326, and configuration store 1328) and SDN controller 1324. In general, SDN controller manager 1325 monitors the cluster for new objects (e.g., pods and services). SDN controller manager 1325 may isolate pods in virtual networks and connect pods with services.

SDN controller manager 1325 may be executed as a container of the master node for a cluster. In some cases, using SDN controller manager 1325 enables disabling the service proxies of minion nodes (e.g., the Kubernetes kube-proxy) such that all pod connectivity is implemented using virtual routers, as described herein.

SDN controller manager 1325 may use the controller framework for the orchestration platform to listen for (or otherwise monitor for) changes in objects that are defined in the API and to add annotations to some of these objects. The annotations may be labels or other identifiers specifying properties of the objects (e.g., "Virtual Network Green"). SDN controller manager 1325 may create a network solution for the application using an interface to SDN controller 1324 to define network objects such as virtual networks, virtual network interfaces, and access control policies. SDN controller 1324 may implement the network solution in the computing infrastructure by, e.g., configuring the one or more virtual network and virtual network interfaces in the virtual routers.

The following example deployment configuration for this application consists of a pod and the network information for the pod that references a NetworkAttachmentDefinition for a VPN, in accordance with techniques of this disclosure. A NetworkAttachmentDefinition is a custom resource for managing network attachment definitions for Pods, and are defined in network attachment definition specifications.

```
apiVersion: v1
kind: Pod
metadata:
    name: du
    annotations:
        k8s.v1.cni.cncf.io/networks: |
        [
            {
            "name": "blue-net"
            "interface": "net1",
            "cni-args": {
                "mac": "aa:bb:cc:dd:01:01",
                "dataplane": "linux",
                "ipconfig": {
                    "ipv4": {
                        "address": "1.1.1.2/30"",
                        "gateway": "1.1.1.1",
                        "routes": [
                            "1.1.0.0/16"
                        ]
                    }
                    "ipv6": {
                        "address": "abcd::1.1.1.2/126",
                        "gateway": "abcd::1.1.1.1",
                        "routes": [
                            "abcd::1.1.0.0/112"
                        ]
                    }
                }
            }
        }
        ]
    spec:
        affinity: [ ### ]
        containers: [ ### ]
```

This metadata information is copied to each pod replica created by the controller manager 1326. When the SDN controller manager 1325 is notified of these pods, SDN controller manager 1325 may program a VRF in a cRPD 324 (executed by any node to which the pod replica will be deployed) for the VPN listed in the annotations (the "blue-net" NetworkAttachmentDefinition referenced in the above example). CNI 312 for the host will create, for the VRF, a virtual network interface per-pod replica (e.g., pod 202A) with a unique private virtual network address (here taken from 1.1.1.2/30 subnet for ipv4). Inside the pod, the interface will be named "net1", and CNI 312 will configure the other end of this interface in a cRPD 324. The interface will be configured with ipconfig info and any routes to be installed inside the pod. In this way, the techniques allow an operator to represent a routing instance using a NetworkAttachmentDefinition and bind a Pod to the NetworkAttachmentDefinition in order to orchestrate a VPN according to a PE-CE VPN service model. For example, the new "cni-args" object causes CNI 312 to configure the pod similarly to configuring a CE router or host, including "routes" for subnets reachable via the pod.

Based on these specifications for Pod and NetworkAttachmentDefinition, SDN controller manager 1325 translates the specification into configuration data that can be consumed by cRPD 324. This configuration data may be operable for configuring a routing instance and cause cRPD 324 to advertise route prefixes, establish protocol sessions, and other aspects of control plane signaling, all of which may be triggered by SDN controller manager 1325 configuring cRPD 324 via an interface of cRPD 324. In some examples, SDN controller 1324 may configure cRPD 324 via an interface of cRPD 324.

The following are examples of a NetworkAttachmentDefinition. A NetworkAttachmentDefinition is a Custom Resource object that describes how to attach a pod to the logical or physical network references by the object. The following examples accord with schemas for a NetworkAttachmentDefinition that have been extend for orchestrating VPNs in accordance with techniques of this disclosure. Orchestrator 23 may receive the NetworkAttachmentDefinition and create the corresponding object instances. SDN controller manager 1325 may put a watch on or listen for events with regard to NetworkAttachmentDefinition object instances and configure the virtual computing infrastructure to realize the intent in the NetworkAttachmentDefinition, including configuring cRPDs 324 and virtualized PE routers 32.

The following blue-l3vpn.yaml defines a L3VPN named "blue-net", which may be referenced by the pod specification above. This L3VPN specifies a VRF name and VRF route target with which SDN controller manager 1325 can create import policies for advertised routing information and export policies for advertising routing information including routes for any Pods attached to this VRF:

```
apiVersion: "k8s.cni.cncf.io/v1"
kind: NetworkAttachmentDefinition
metadata:
  name: blue-net
spec:
  config: '{
    "cniVersion":"0.4.0",
    "name": "blue-net",
    "type": "jcnr",
    "args": {
      "vrfName": "blue",
      "vrfTarget": "11:11"
    },
    "kubeConfig":"/etc/kubernetes/kubelet.conf"
  }'
```

The following blue-evpn.yaml defines an EVPN named "blue-net", which may be referenced by the pod specification above. This EVPN specifies a VRF name and VRF route target with which SDN controller manager 1325 can create import policies for advertised routing information and export policies for advertising MAC addresses (here, in EVPN Type-5 messages) including for any Pods attached to this VRF. The blue-evpn.yaml also specifies a VxLAN Virtual Network Identifier for the EVPN-VXLAN:

```
apiVersion: "k8s.cni.cncf.io/v1"
kind: NetworkAttachmentDefinition
metadata:
  name: blue-net
spec:
  config: '{
    "cniVersion":"0.4.0",
    "name": "blue-net",
    "type": "jcnr",
    "args": {
      "applyGroups":"evpn-type5",
      "vxlanVNI":"10002",
      "vrfName": "blue",
      "vrfTarget": "11:11"
    },
    "kubeConfig":"/etc/kubernetes/kubelet.conf"
  }'
```

The following vswitch.yaml includes multiple NetworkAttachmentDefinitions for various bridge domains for an L2VPN, causing the virtualized router 35 to operate as a virtual switch:

```
apiVersion: "k8s.cni.cncf.io/v1"
kind: NetworkAttachmentDefinition
metadata:
  name: vswitch-pod1-bd100
spec:
  config: '{
    "cniVersion":"0.4.0",
    "name": "vswitch-pod1-bd100",
    "capabilities":{"ips":true},
    "plugins": [
      {
        "type": "jcnr",
        "args": {
          "instanceName": "vswitch",
          "instanceType": "virtual-switch",
          "bridgeDomain": "bd100",
          "bridgeVlanId": "100"
        },
        "ipam": {
          "type": "static",
          "capabilities":{"ips":true},
          "addresses":[
            {
              "address":"99.61.0.2/16",
              "gateway":"99.61.0.1"
            },
            {
              "address":"1234::99.61.0.2/120",
              "gateway":"1234::99.61.0.1"
            }
          ]
        },
        "kubeConfig":"/etc/kubernetes/kubelet.conf"
      }
    ]
  }'
---
apiVersion: "k8s.cni.cncf.io/v1"
kind: NetworkAttachmentDefinition
metadata:
  name: vswitch-pod1-bd200
spec:
  config: '{
    "cniVersion":"0.4.0",
    "name": "vswitch-pod1-bd200",
    "capabilities": {"ips":true},
    "plugins": [
      {
        "type": "jcnr",
        "args": {
          "instanceName": "vswitch",
          "instanceType": "virtual-switch",
          "bridgeDomain": "bd200",
          "bridgeVlanId": "200"
        },
```

```
          "ipam": {
            "type": "static",
            "capabilities":{"ips":true},
            "addresses":[
              {
                "address":"99.62.0.2/16",
                "gateway":"99.62.0.1"
              },
              {
                "address":"1234::99.62.0.2/120",
                "gateway":"1234::99.62.0.1"
              }
            ]
          },
          "kubeConfig":"/etc/kubernetes/kubelet.conf"
        }
      ]
    }'
---
apiVersion: "k8s.cni.cncf.io/v1"
kind: NetworkAttachmentDefinition
metadata:
  name: vswitch-pod1-bd300
spec:
  config: '{
      "cniVersion":"0.4.0",
      "name": "vswitch-pod1-bd300",
      "capabilities":{"ips":true},
      "plugins": [
        {
          "type": "jcnr",
          "args": {
            "instanceName": "vswitch",
            "instanceType": "virtual-switch",
            "bridgeDomain": "bd300",
            "bridgeVlanId": "300"
          },
          "ipam": {
            "type": "static",
            "capabilities":{"ips":true},
            "addresses":[
              {
                "address":"99.63.0.2/16",
                "gateway":"99.63.0.1"
              },
              {
                "address":"1234::99.63.0.2/120",
                "gateway":"1234::99.63.0.1"
              }
            ]
          },
          "kubeConfig":"/etc/kubernetes/kubelet.conf"
        }
      ]
    }'
```

The following pod specification references the above NetworkAttachmentDefinitions. SDN controller manager 1325 creates corresponding interfaces for any pod replica to use the bridge domains defined in the above NetworkAttachmentDefinitions of vswitch.yaml. In this example, the IP addresses for the pod replicas are assigned from the IPAMs of the NetworkAttachmentDefinitions.

```
apiVersion: v1
kind: Pod
metadata:
  name: odu-pod1
  annotations:
    k8s.v1.cni.cncf.io/networks: |
      [
        {
          "name": "vswitch-pod1-bd100",
          "interface":"net1",
          "cni-args": {
            "mac":"00:11:11:11:60:11",
            "dataplane":"linux"
          }
        },
        {
          "name": "vswitch-pod1-bd200",
          "interface":"net2",
          "cni-args": {
            "mac":"00:11:11:11:60:21",
            "dataplane":"linux"
          }
        },
        {
          "name": "vswitch-pod1-bd300",
          "interface":"net3",
          "cni-args": {
            "mac":"00:11:11:11:60:31",
            "dataplane":"linux"
          }
        }
      ]
spec:
  affinity:
    nodeAffinity:
      requiredDuringSchedulingIgnoredDuringExecution:
        nodeSelectorTerms:
        - matchExpressions:
          - key: kubernetes.io/hostname
            operator: In
            values:
            - kind-worker
  containers:
  - name: odu1
    image: localhost:5000/crpd:latest
    imagePullPolicy: Never
    securityContext:
      privileged: false
    env:
    - name: KUBERNETES_POD_UID
      valueFrom:
        fieldRef:
          fieldPath: metadata.uid
    volumeMounts:
    - name: dpdk
      mountPath: /dpdk
      subPathExpr: $(KUBERNETES_POD_UID)
  volumes:
  - name: dpdk
    hostPath:
      path: /var/run/jcnr/containers
```

Additional techniques in accordance with this disclosure are described below. Contrail is an example network controller architecture. Contrail CNI may be a CNI developed for Contrail. A Contrail controller may be an example of an SDN controller described in this disclosure, such as network controller 24.

Figure 5:
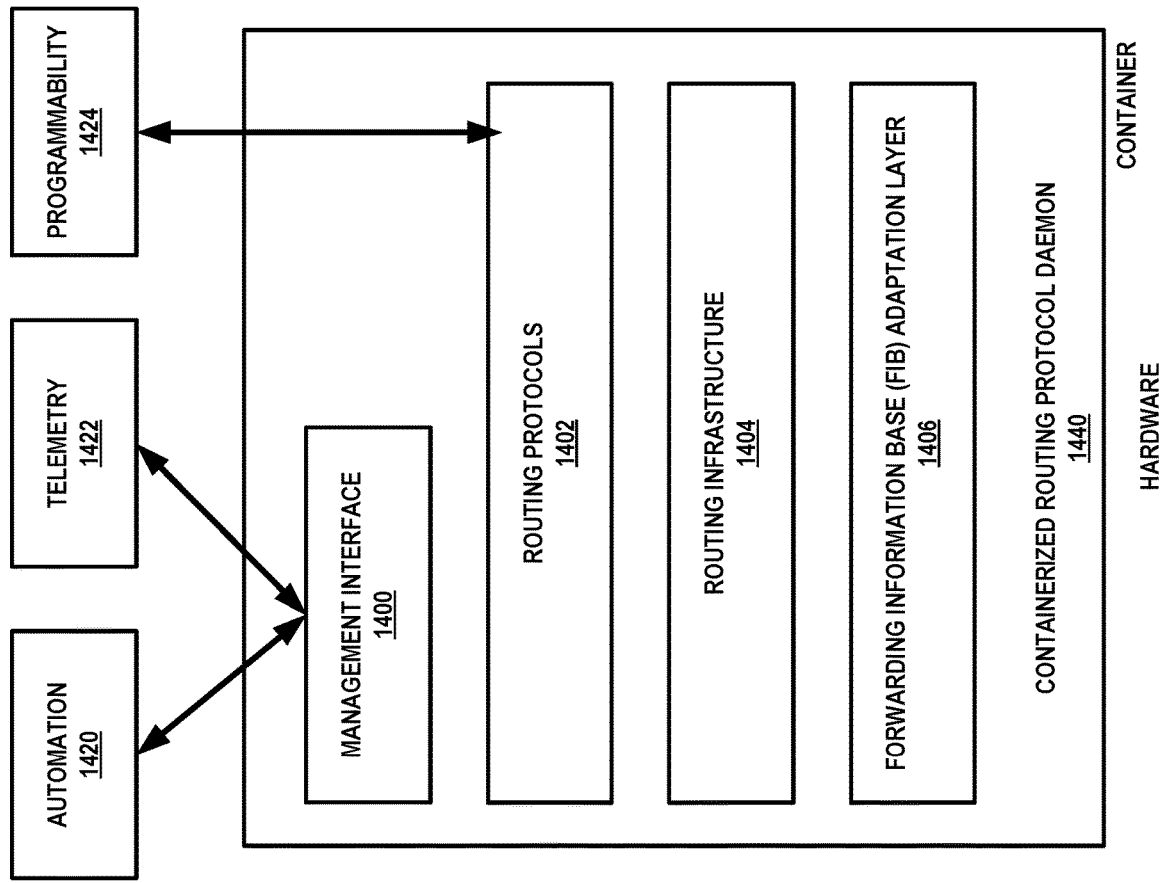
FIG. 5 is a block diagram illustrating an example implementation of a cRPD, which an orchestrator may deploy using a pod, according to techniques described in this disclosure.

FIG. 5 is a block diagram illustrating an example implementation of cRPD or any other cRPD of this disclosure, which an orchestrator may deploy using a pod, in accordance with techniques of this disclosure. cRPD 1440 may be deployed as a microservice in Docker, coreOS (rkt), or other container platform.

cRPD 1440 includes management interface 1400, which may represent one or more of a command line interface (CLI), Netconf, secure shell (SSH), PCEP, Simple Network Management Protocol (SNMP) interface, or other management interface. Management interface 1400 may support YANG, OpenConfig, or other configuration data formats. Management interface 1400 may receive configuration data from automation systems 1420 and may output telemetry data to telemetry systems 1422. A CNI may program cRPD 1440 via management interface 1400, as described in further detail above.

cRPD 1440 implements routing protocols 1402, which may include BGP, OSPF, IS-IS, LDP, segment routing, and may receive static routes for programming from a controller or automation system (represented by programmability 1424). cRPD 1440 includes routing infrastructure 1404 to support routing protocols 1402. Routing infrastructure 1404 may include a Routing Information Base (RIB), RIB manager, Label Information Base (LIB), LIB manager. Routing infrastructure 1404 may implement Bidirectional Forwarding Detection (BFD). cRPD 1440 includes a forwarding information base (FIB) adaptation layer 1406 to integrate cRPD 1440 into the data plane by enabling configuring forwarding information in the data plane. For example, FIB adaptation layer 1406 may implement a gRPC, Netlink, or rtsock interface to program a vRouter (e.g., a DPDK-based vRouter). FIB adaptation layer 1406 may implement another type of interface to program a vRouter, kernel-based vSwitch, SmartNIC, network processor, ASIC-based forwarding chips, or other data plane.

Figure 6:
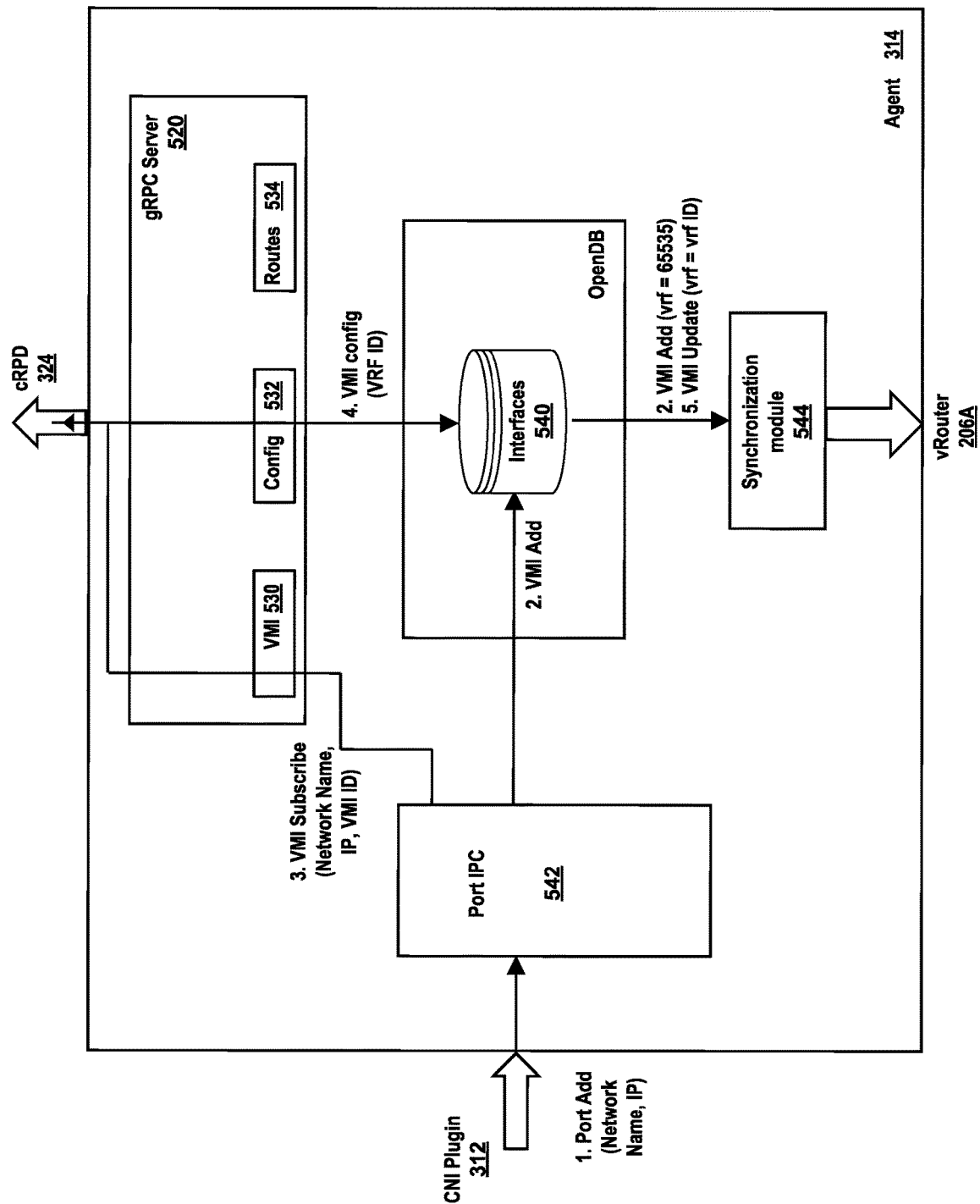
FIG. 6 is a block diagram illustrating an example vRouter agent, according to techniques of this disclosure.

FIG. 6 is a block diagram illustrating an example vRouter agent, according to techniques of this disclosure. vRouter agent 314 includes gRPC server 520 for exchanging data with cRPD 324 (a gRPC client) via a generic interface 340. APIs of gRPC server 520 include virtual machine interface (VMI) APIs 530 for exchanging virtual network interface data and requests, configuration APIs 532 for exchanging configuration data and requests, and route APIs 534 for exchanging routes and requests—including for enabling cRPD 324 to program routes to vRouter 206A via vRouter agent 314. Synchronization module 544 programs vRouter 206A with virtual network interfaces (e.g., part of a veth pair or a virtio-vhost interface between a DPDK pod and DPDK-based vRouter 206A) and programs vRouters 206A with routing information.

Interfaces 540 may represent a data structure that stores data describing virtual network interfaces for application pods executing on the server that executes vRouter agent 314. Port service 542 listens for requests from CNI 312, such as request to add new "ports" for application pods, which port service 542 may translate to subscribe requests to cRPD 324 via interface 340 to obtain virtual network interface configuration information from cRPD 324. Port service 542 may be implemented using a REST server.

In this way, vRouter agent 314 provides a generic interface 340 (as illustrated in FIG. 3) to the data plane for overlay traffic sourced by or destined to application pods on the server. This generic interface 340 may be implemented by any controller, routing protocol process, or other agent because it relies on gRPC rather than a proprietary interface.

Figure 7:
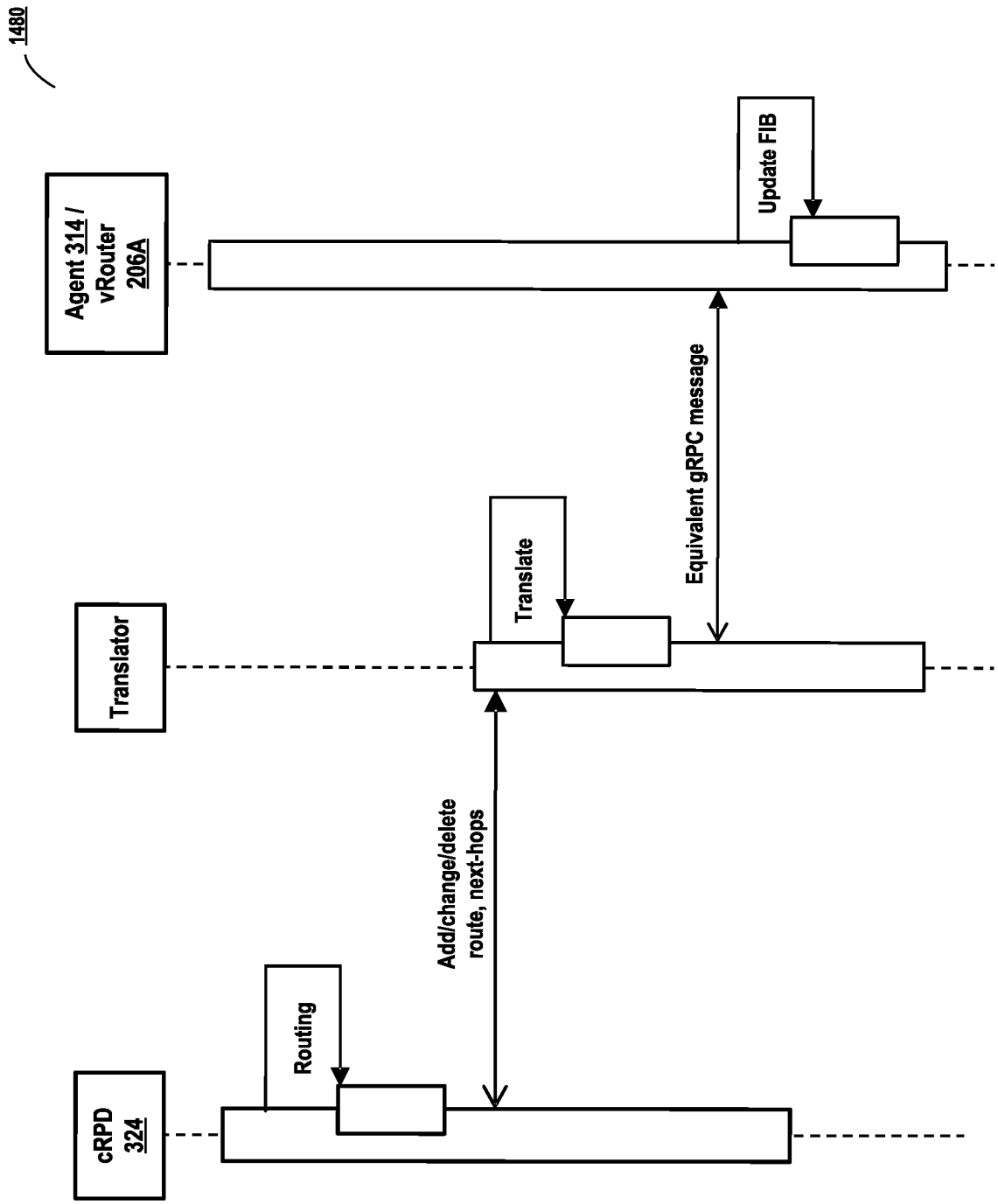
FIG. 7 is a conceptual diagram illustrating example operations for programming virtual router forwarding information, according to techniques of this disclosure.

FIG. 7 is a conceptual diagram illustrating example operations 1480 for programming vRouter forwarding information, according to techniques of this disclosure. cRPD 324 determines to update the forwarding information and does so by adding, changing, or deleting routes and adjust next hops in the forwarding plane. A translator component for cRPD 324 can translate instructions for programming a hardware forwarding plane to equivalent instructions for virtual router agent 314 and invokes a northbound interface of virtual router agent 314 (provided in some examples by gRPC server 520), which programs a forwarding information base of virtual router 206A to perform packet forwarding accordingly.

Figure 8:
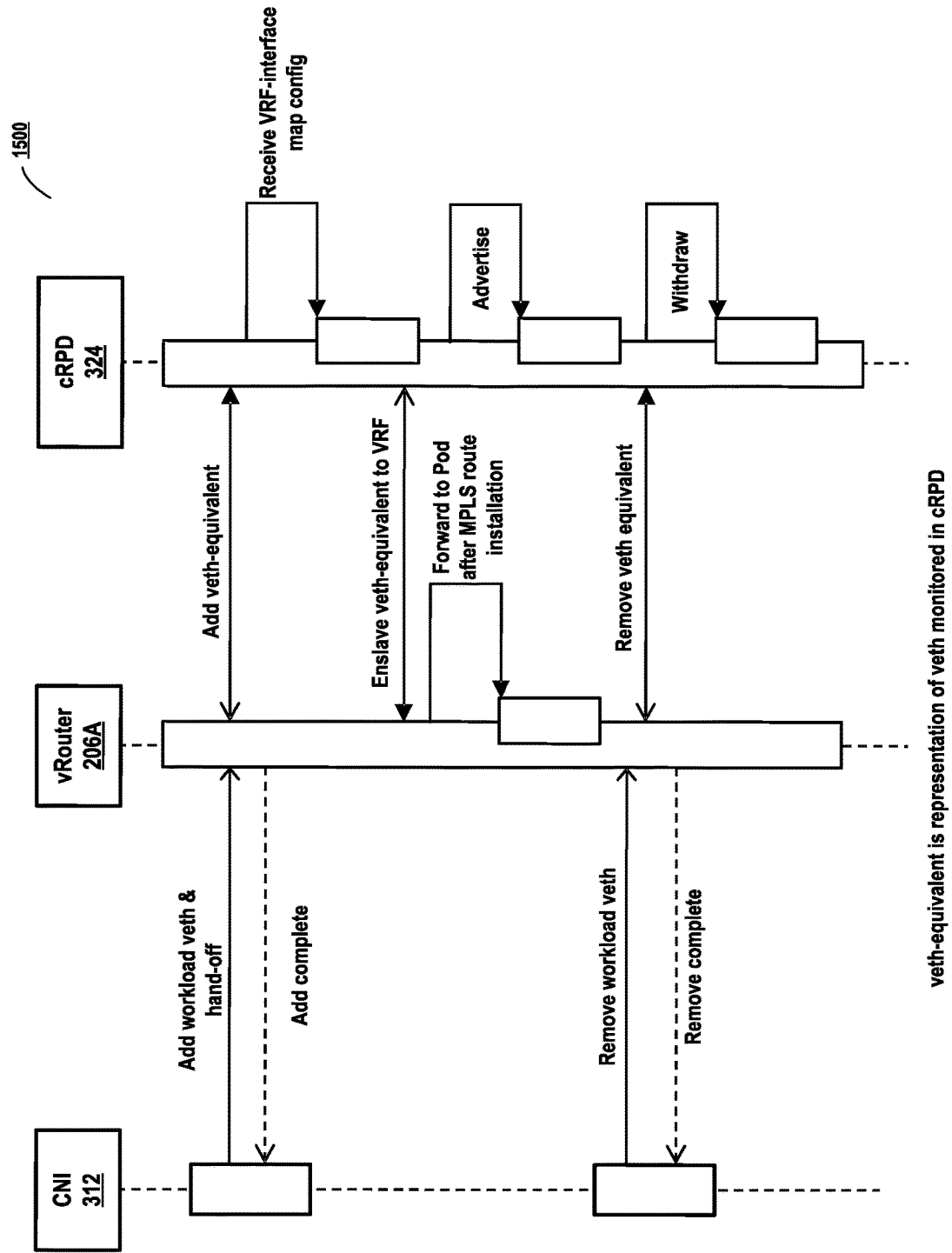
FIG. 8 is a conceptual diagram illustrating example operations for configuring and advertising a virtual network interface in a server having a virtualized router, according to techniques of this disclosure.

FIG. 8 is a conceptual diagram illustrating example operations 1500 for configuring and advertising a virtual network interface in a server having a virtualized router, according to techniques of this disclosure.

To provide reachability over tunnels, cRPD 324 may be configured with the requisite protocols (IGPs, BGP, etc.). vRouter 206A would manage the physical core-facing network interface—over which routing traffic would be sent and received, but cRPD 324 is brought up in host network mode and has access to this physical interface.

cRPD 324 may be configured with the requisite protocols through Netconf other configuration protocol, via a network controller. cRPD 324 will establish adjacencies for various protocols; learn and advertise the routing information (including reachability to application containers) using its routing protocols. cRPD 324 needs to program this learnt routing information to the vRouter agent 314. vRouter 206A will provide a bidirectional gRPC channel 340 for to-and-fro communication with cRPD 324. The data objects (routes, VRFs, interfaces etc.) may be modelled in protocol buffers.

As depicted in FIG. 8, a cRPD-based CNI 312 may create the veth-equivalent pairs for each of the application containers on being notified by Kubernetes/orchestration agent 310. It is the responsibility of CNI 312 to assign IP addresses to these interfaces. One end of the veth-equivalent pair would terminate in the Application Container's interface. As for the other end, CNI 312 would request the vRouter 206A to start monitoring this end of the veth-equivalent interfaces. This facilitates all tunneled traffic from the physical ports headed for application containers. CNI 312 may rely on IP Address Manager (IPAM) to obtain IP address information. The CNI 312 may therefore obtain the IP address information from virtual router agent 314 received from SDN controller manager 1325, from a DHCP server, static allocation, or from custom allocators. In some examples, the virtual network interfaces for at least some of the application containers enable DPDK. As such, virtio-net interfaces may be attached to the application container (or Pod) and the vhost-net end is attached to DPDK-enabled vRouter 206A.

In some examples, since vRouter 206A now manages one end of these veth interfaces, these are not visible from kernel 380. Hence, these interfaces are not visible to cRPD 324 and thus cRPD 324 can't announce reachability information to the outside world. To solve this problem, a veth equivalent interface may be made visible to cRPD 324. This will not be an interface over which cRPD 324 could run routing protocols (as that requires using kernel facilities as sockets, TCP/IP stack, etc.). This interface is there to notify cRPD 324 of reachability it needs to advertise.

vRouter 206A may directly inform cRPD 324 about this interface in some cases. This may be preferable because it is in some ways similar to how current VRFs are handled in cRPD 324. In addition, if this interface goes down, vRouter 206A can inform cRPD 324. If cRPD starts, vRouter 206A can let cRPD know of all the interfaces it is monitoring again.

With these interfaces, cRPD 324 can advertise MPLS reachability to reach the application containers. cRPD 324 can either advertise vrf-table-label or a per-nexthop label (where next-hop represents the veth equivalent) or per-prefix label. When this MPLS route may be installed to vRouter 206A, vRouter agent 314 will have the ability to translate veth-equivalent to the actual veth interface.

Below are further example sequences of operations among various components, according to one or more aspects of this disclosure:

I. Interaction among various components for creating initial connectivity
  1. cRPD 324 324 learns about vhost0 form kernel through netlink.
  2. Domain/network controller configures (IGP and BGP) protocol configuration on cRPD 324 via Netconf or other management protocol. Alternatively, an operator can use CLI on cRPD 324 to do this manually.

3. cRPD 324 establishes IGP adjacencies and learns network reachability and Segment Routing information.
4. cRPD 324 programs this reachability information to the host kernel over existing netlink channel.
5. cRPD 324 establishes BGP session over IGP learnt connectivity.
6. BGP learns L3VPN routes over this BGP session.
7. cRPD 324 learns about workload interfaces from virtual router 206A. cRPD 324 creates the subnet (say /30) and interface routes (/32) corresponding to this interface.
8. CNI 312 configures the workload interface under specific VRFs on cRPD 324. For DPDK interfaces, CNI 312 also interacts with virtual router 206A to bring up the virtio-net/vhost-net interface between pod and virtual router 206A. Virtual router 206A in turn notifies cRPD 324 (over gRPC-based FIB channel) about the interface becoming available.
9. cRPD 324 sends vrf-interface mapping to the virtual router 206A.
10. cRPD 324 imports l3vpn routes received in step 6. to the appropriate vrfs and resolves them over SR tunnels from step 3.
11. cRPD 324 install these tunneled routes (in vrf.inet(6) .0 table) to virtual router 206A. (virtual router 206A needs to do vhost0 to physical port0 translation).
12. Also, cRPD 324 advertises l3vpn routes for the vrf routes from step 7.
13. cRPD 324 install mpls.0 routes with pop label and forward to workload semantics.

II. Interaction among various components when workload interface goes down.
1. Upon triggering by CNI 312 requesting to remove the interface, virtual router 206A notifies cRPD 324 of interface deletion.
2. cRPD 324 deletes subnet and interface route.
3. cRPD 324 sends withdrawal of reachability to the workloads.
4. cRPD 324 deletes mpls.0 tunnel routes with pop and forwarding to workload semantic from the virtual router 206A.

III. Interaction among various components on VRF deletion.
1. cRPD 324 internally deletes l3vpn routes received in step 6 (Interaction I.) from the appropriate vrf.
2. cRPD 324 sends deletes for these routes (in vrf.inet(6) .0 table), with tunnel next-hops to vRouter.
3. Also, cRPD 324 withdraws l3vpn routes for the vrf routes from step 8 (Interaction I.)
4. cRPD 324 sends deletes to virtual router 206A for mpls.0 routes with pop label and forward to workload semantics.

In an aspect of the disclosure, a set of software components provides CNI functionality that address networking requirements unique to cloud native 5G network environments. The software components include a containerized routing protocol daemon (cRPD) to support a Network Service Mesh (NSM) architecture. The set of software components support NSM architecture and may provide additional capabilities such as hybrid networking (between physical and virtual infrastructure), direct reachability to a Pod from outside a cluster of compute nodes to, e.g., advertise over protocols such as BGP, set up tunnels dynamically using various technologies such as MPLS, SRv6, IP-IP/VxLAN/GRE, IPsec, etc.

In a use case of this aspect, a 5G O-RAN network may be deployed using cloud native technologies and follow the 5G split in which the DU (Distributed Unit) and CSR (Cell Site Router) are virtualized and run on a compute node in a pod and as an instance of a virtualized router. The set of software components may operate as a cell-site router to provide L3 reachability for the mid-haul for the 5G network.

The software components use cRPD 324 to distribute Layer 3 (L3) network reachability information of the Pods not just within the cluster, but also outside the cluster. The cRPD also programs the data plane on each compute node. For better network packet I/O performance, the DU application may run in the application Pod to bypasses the kernel networking stack and abstractions, and thereby use, e.g., zero-copy mechanisms to directly send/receive packets from the physical NIC. Data Plane Development Kit (DPDK) is one such framework, and a DPDK-based virtual router may be used as a userspace data plane that leverages DPDK for high forwarding performance for this purpose.

The software components may include a DPDK-based virtual router to support DPDK applications. A CNI plugin manages the DPDK configuration for application and programs the virtual router. This may include setting up a vhost control channel and assigning IP (e.g., both IPv4 and IPv6) and MAC addresses, advertising the Pod IP addresses, and detecting and withdrawing the routes when the Pod is considered down or removed.

Most of the existing use cases for cRPD either provide control-plane-only routing functionality such as BGP Route Reflectors or drive the forwarding-planes: kernel-based or ASIC based forwarding-plane on white box platforms. The rise of containers and cloud computing led to the need for container orchestration platforms to manage the life cycle of the containers. Kubernetes (K8s) is an orchestration platform for running containerized applications in a clustered computing environment. It provides automatic deployment, scaling, networking and management of containerized applications. A K8s pod consists of one or more containers representing an instance of application and is the smallest unit that K8s can handle. All containers in the pod share the same network namespace. Container Network Interface (CNI) provides networking for application pods in Kubernetes. It takes care of setting up pod interfaces, address assignment and networking between pods in a k8s cluster and network isolation between different workloads.

CNI 312 may CNI functionality along with capabilities useful for supporting Network Service Mesh (NSM) architecture.

While there exist many CNI solutions, mainly catering to the data-center use cases, the techniques described herein may address the networking requirements unique to cloud native 5G environment by interacting with cRPD 324 to provide NSM functionality. A CNI that supports NSM architecture provides additional capabilities such as hybrid networking (between physical and virtual infrastructure), direct reachability to Pod from outside the cluster to, e.g., advertise over protocols such as BGP, setup tunnels dynamically using various technologies such as MPLS, SRv6, IP-IP/VxLAN/GRE, IPsec, etc.

A 5G O-RAN network may be deployed using cloud native technologies and follows 5G 7.2 split where the DU (Distributed Unit) and CSR (Cell Site Router) are virtualized and run on a server. CNI 312 acts as a cell-site router to provide L3 reachability for the mid-haul.

cRPD 324 may distribute Layer-3 network reachability information of the Pods not just within a Kubernetes cluster (in Kubernetes deployments), but also outside the cluster.

cRPD 324 also takes care of programming the corresponding forwarding-plane virtual router 206A on each compute node/server.

vRouter 206A supports DPDK applications. CNI 312 will take care of setting up DPDK configuration for applications and programming vrouter 206A. This includes setting up of vhost control channel and assigning IP (both IPv4 and IPv6) and mac addresses, advertise the Pod IP addresses and detect and withdraw the routes when the Pod is considered down or removed.

Other features provided by aspects described in this disclosure include:

- Using L3 routing protocols such as BGP and IS-IS to advertise network reachability of pods
- Advertising reachability within cluster and outside the cluster using BGP
- Network namespaces (supported using L3 VPN and EVPN Type-5) ACLs and Network Policies for security and QoS
- Support for tunnels: MPLS, SR-MPLS, SRv6, SR-MPLSoIPv6, VxLAN, IPIP, GRE Dynamic tunnels signaled using BGP
- IPsec tunnels for traffic encryption
- Network Policies to provide security, isolation
- Integration with DPDK versions of vRouter 206A for higher forwarding performance, encapsulation, packet filtering and QoS
- Delivery as set of containers that can deployed in K8s using an YAML specification file.

Together, the set of components that make up a CNI 312, the virtualized router, the SDN controller 1324 and SDN controller manager 1325, may be considered a Kubernetes CNI, referred to herein as the Platter CNI—this is distinct from the CNI 312 plugin but instead encompasses a networking solution for the container orchestration system and may implement the Container Network Interface.

The CNI 312 and the virtualized router may provide one or more of the following features:

- Network namespaces: Application pods should be reachable via non-default network namespace or routing instance implemented using L3 VPNs.
- IPv6 Underlay: Support IPv6 underlay as required by the use-case. IGP protocols should be capable of exchanging IPv6 routes. BGP protocol sessions should be setup using IPv6 addresses.
- IPv6 Overlay: Support IPv6 overlays by assigning IPv6 addresses to the pod and advertising them over BGP.
- BGP: Platter runs on each node in k8s cluster and uses BGP to advertise pod reachability to the network. Routes advertised over BGP may carry SRv6 label stack or other tunnel encapsulation attributes.
- IGP: Each node will participate in IGP underlay to learn reachability to other BGP peers and route reflectors. IS-IS may be used to advertise host/node addresses to the network.
- SRv6: Pod traffic may be carried over SRv6 tunnels. IS-IS is used to learn segment routing SID information.
- vrouter-dpdk: For better packet I/O performance, support vrouter-dpdk as the data-plane in some cases. This includes allocation of IP and mac addresses, generating suitable DPDK configuration for the application, programming of vrouter and advertising the routes.

Deployment in a K8s cluster is performed using YAML file which contains various details about all the containers that are part of the CNI: repositories the images are hosted on, order of initialization, environment variables, configuration, and license key information. Typically, a YAML file will be customized to suit Kubernetes deployment. A sample YAML configuration (platter.yml) for platter CNI is provided below:

```
kind: ClusterRole
apiVersion: rbac.authorization.k8s.io/v1
metadata:
  name: crpd
rules:
  - apiGroups:
    - ""
    resources:
    - nodes
    verbs:
    - list
    - watch
---
kind: ClusterRoleBinding
apiVersion: rbac.authorization.k8s.io/v1
metadata:
  name: crpd
roleRef:
  apiGroup: rbac.authorization.k8s.io
  kind: ClusterRole
  name: crpd
subjects:
- kind: ServiceAccount
  name: crpd
  namespace: kube-system
---
apiVersion: v1
kind: ServiceAccount
metadata:
  name: crpd
  namespace: kube-system
---
apiVersion: apps/v1
kind: DaemonSet
metadata:
  name: kube-crpd-worker-ds
  namespace: kube-system
  labels:
    k8s-app: kube-crpd-worker
spec:
  selector:
    matchLabels:
      name: kube-crpd-worker-ds
  template:
    metadata:
      labels:
        name: kube-crpd-worker-ds
    spec:
      affinity:
        nodeAffinity:
          requiredDuringSchedulingIgnoredDuringExecution:
            nodeSelectorTerms:
            - matchExpressions:
              - key: kubernetes.io/os
                operator: In
                values:
                - linux
              - key: kubernetes.io/arch
                operator: In
                values:
                - amd64
              - key: "node-role.kubernetes.io/master"
                operator: DoesNotExist
      hostNetwork: true
      tolerations:
      - operator: Exists
        effect: NoSchedule
      initContainers:
        - name: install-cni
          image: localhost:5000/platter:latest
          volumeMounts:
          - name: cni
            mountPath: /host
          - name: platter-config
            mountPath: /etc/platter
          - name: node-config
```

```
        mountPath: /etc/platter-node-config
      - name: secrets
        mountPath: /etc/secrets
      securityContext:
        privileged: true
        capabilities:
          add:
            - NET_ADMIN
            - NET_RAW
            - SYS_ADMIN
      env:
        - name: NODE_IP
          valueFrom:
            fieldRef:
              fieldPath: status.hostIP
        - name: IS_MASTER
          value: "False"
        - name: CRPD_CONFIG_TEMPLATE
          value: "/etc/platter/crpd-config.tmpl"
        - name: PRIMARY_CNI
          # Set to True if Platter is primary CNI
          value: "False"
    containers:
      - name: kube-crpd-worker
        image: localhost:5000/crpd:latest
        # Uncomment the line if loading images directly on the node
        #imagePullPolicy: Never
        volumeMounts:
          - name: conf
            mountPath: /config
          - name: cni
            mountPath: /host
          - name: secrets
            mountPath: /etc/secrets
        securityContext:
          privileged: true
          capabilities:
            add:
              - NET_ADMIN
              - SYS_ADMIN
        env:
          - name: NODE_IP
            valueFrom:
              fieldRef:
                fieldPath: status.hostIP
          - name: IS_MASTER
            value: "False"
    volumes:
      - name: cni
        hostPath:
          path: /
      - name: conf
        hostPath:
          path: /etc/crpd
      - name: platter-config
        configMap:
          name: platter-config
      - name: node-config
        configMap:
          name: platter-node-config
      - name: secrets
        secret:
          secretName: platter-secrets
    serviceAccountName: crpd
---
apiVersion: apps/v1
kind: DaemonSet
metadata:
  name: kube-crpd-master-ds
  namespace: kube-system
  labels:
    k8s-app: kube-crpd-master
spec:
  selector:
    matchLabels:
      name: kube-crpd-master-ds
  template:
    metadata:
      labels:
        name: kube-crpd-master-ds
    spec:
      affinity:
        nodeAffinity:
          requiredDuringSchedulingIgnoredDuringExecution:
            nodeSelectorTerms:
              - matchExpressions:
                  - key: node-role.kubernetes.io/master
                    operator: Exists
      hostNetwork: true
      tolerations:
        - key: node-role.kubernetes.io/master
          operator: Exists
          effect: NoSchedule
        - key: node.kubernetes.io/not-ready
          operator: Exists
          effect: NoSchedule
        - key: node.kubernetes.io/not-ready
          operator: Exists
          effect: NoExecute
      initContainers:
        - name: install-cni
          image: localhost:5000/platter:latest
          volumeMounts:
            - name: cni
              mountPath: /host
            - name: platter-config
              mountPath: /etc/platter
            - name: node-config
              mountPath: /etc/platter-node-config
            - name: secrets
              mountPath: /etc/secrets
          securityContext:
            privileged: true
            capabilities:
              add: ["NET_ADMIN"]
          env:
            - name: NODE_IP
              valueFrom:
                fieldRef:
                  fieldPath: status.hostIP
            - name: IS_MASTER
              value: "True"
            - name: CRPD_CONFIG_TEMPLATE
              value: "/etc/platter/crpd-config.tmpl"
            - name: PRIMARY_CNI
              # Set to True if Platter is primary CNI
              value: "False"
      containers:
        - name: kube-crpd-master
          image: localhost:5000/crpd:latest
          volumeMounts:
            - name: conf
              mountPath: /config
          securityContext:
            privileged: true
            capabilities:
              add: ["NET_ADMIN"]
          env:
            - name: NODE_IP
              valueFrom:
                fieldRef:
                  fieldPath: status.hostIP
            - name: IS_MASTER
              value: "True"
      volumes:
        - name: cni
          hostPath:
            path: /
        - name: conf
          hostPath:
            path: /etc/crpd
        - name: platter-config
          configMap:
            name: platter-config
        - name: node-config
          configMap:
            name: platter-node-config
        - name: secrets
```

```
         secret:
           secretName: platter-secrets
    serviceAccountName: crpd
```

Pod YAML Config

Pod YAML should export the Pod UID as KUBERNETES_POD_UID which may be needed by DPDK application.

Annotations

Annotations may be used to set the following optional configuration details needed by Platter:

VRF Name: Used to add the interface to a routing-instance

VRF Target: Used to advertise instance routes over BGP

Sample Configuration

A sample application YAML config with environment variables and annotations is shown below. A different schema for a pod YAML is provided earlier in this disclosure with name "du".

```
apiVersion: v1
kind: Pod
metadata:
  name: ubuntu
  annotations:
    # Required when Platter is secondary CNI or have multiple interfaces
    # Platter is invoked for each network it is configured for.
    # If a network name is repeated, CNI is invoked for each repetition.
    k8s.v1.cni.cncf.io/networks: platter, platter
spec:
  containers:
  - name: ubuntu
    image: localhost:5000/ubuntu:latest
    securityContext:
      privileged: true
    env:
    - name: KUBERNETES_POD_UID
      valueFrom:
        fieldRef:
          fieldPath: metadata.uid
    volumeMounts:
    - name: dpdk
      mountPath: /config/dpdk
```

Node Config

Initial versions of Platter will use a statically defined pod network configuration loaded using a config map files. This config map is read during Platter CNI installation and stored on each node as a file. This config file holds details on per application per interface basis and includes such IP addresses, routing-instance details. Each time Platter CNI is invoked to setup a pod interface, using pod name and interface name as the key, it finds the interface configuration details required to bring up the interface.

Sample Node Config Map

A sample application YAML config (platter-node-config-.yaml) with environment variables and annotations is shown below:

```
       apiVersion: v1
       kind: ConfigMap
       metadata:
         name: platter-node-config
       data:
         # <node-name>-<pod-name>.json
         kind-worker-ubuntu.json: |
         {
           "interfaces":{
             "eth0":{
               "mac":"aa:bb:cc:dd:ee:01",
               "vrfName":"red",
               "rd":"1.1.1.2:10",
               "vrfTarget":"1:1",
               "interface":"eth0",
               "ipConfig":{
                 "ipv4":{
                   "address":"1.0.1.2/30",
                   "gateway":"1.0.1.1"
                 },
                 "ipv6":{
                   "address":"abcd::1.0.1.2/126",
                   "gateway":"abcd::1.0.1.1"
                 }
               }
             },
             "net1":{
               "mac":"aa:bb:cc:dd:ee:11",
               "vrfName":"blue",
               "rd":"1.1.1.2:11",
               "vrfTarget":"1:1",
               "interface":"net1",
               "dataplane":"kernel",
               "ipConfig":{
                 "ipv4":{
                   "address":"1.1.1.2/30",
                   "gateway":"1.1.1.1"
                 },
                 "ipv6":{
                   "address":"abcd::1.1.1.2/126",
                   "gateway":"abcd::1.1.1.1"
                 }
               }
             }
           }
         }
         kind-worker2-ubuntu.json: |
         {
           "interfaces":{
             "eth0":{
               "mac":"aa:bb:cc:dd:ee:21",
               "vrfName":"red",
               "rd":"1.1.2.2:10",
               "vrfTarget":"1:1",
               "interface":"eth0",
               "ipConfig":{
                 "ipv4":{
                   "address":"1.0.1.2/30",
                   "gateway":"1.0.1.1"
                 },
                 "ipv6":{
                   "address":"abcd::1.0.1.2/126",
                   "gateway":"abcd::1.0.1.1"
                 }
               }
             },
             "net1":{
               "mac":"aa:bb:cc:dd:ee:22",
               "vrfName":"blue",
               "rd":"1.1.2.2:11",
               "vrfTarget":"1:1",
               "interface":"net1",
               "dataplane":"kernel",
               "ipConfig":{
                 "ipv4":{
                   "address":"1.1.2.2/30",
                   "gateway":"1.1.2.1"
                 },
                 "ipv6":{
                   "address":"abcd::1.1.2.2/126",
                   "gateway":"abcd::1.1.2.1"
                 }
               }
             }
           }
         }
```

Figure 9:
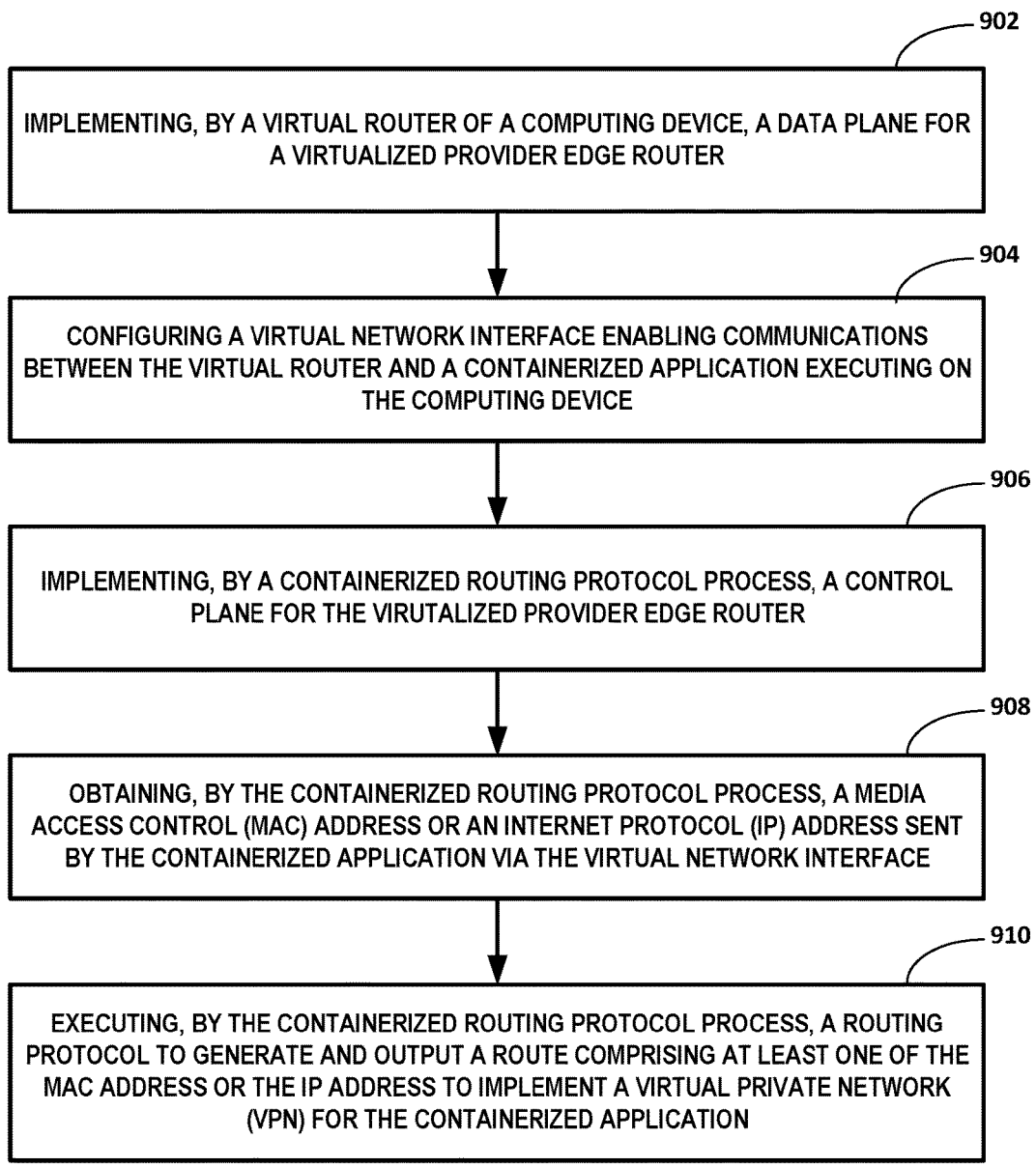
FIG. 9 is a flowchart illustrating an example mode of operation of components of a computing device, according to techniques described here.

FIG. 9 is a flowchart illustrating an example mode of operation for a computing device. Operation 900 is described with respect to computing device 200 of FIG. 2 but may be performed by other computing devices in this disclosure. Virtual router 206A implements a data plane for a virtualized PE router (902). CNI 312 configures a virtual network interface (e.g., a DPDK-enabled channel) enabling communications between virtual router 206A and a containerized application represented by containers 229A (904). Containerized RPD 324 implements a control plane for the virtualized PE router (906). Containerized RPD 324 obtains a MAC address or an IP address sent by the containerized application (908). Containerized RPD 324 executes a routing protocol to generate and output a route comprising at least one of the MAC address or the IP address to implement a VPN for the containerized application (910).

Figure 10:
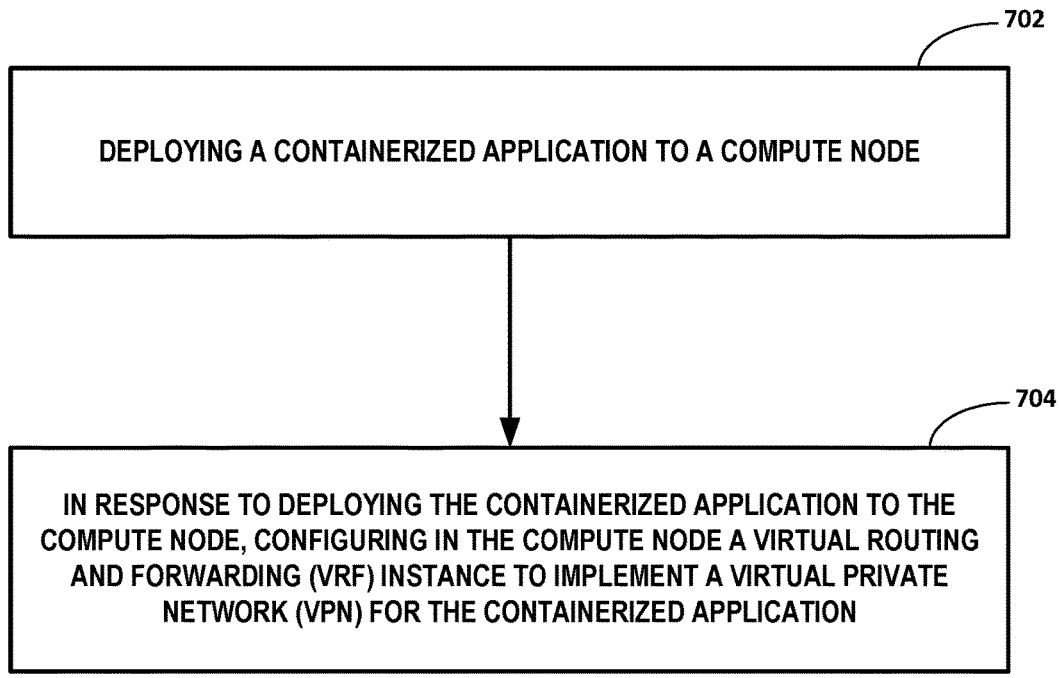
FIG. 10 is a flowchart illustrating an example mode of operation, according to techniques described here.

FIG. 10 is a flowchart illustrating an example mode of operation for a container orchestration platform, such as orchestrator 23. Orchestrator 23 deploys a containerized application to a compute node (e.g., server 12A) (702). In response to deploying the containerized application to the compute node, orchestrator 23 configures in the compute node a virtual routing and forwarding (VRF) instance to implement a virtual private network (VPN) for the containerized application (704).

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A computing device comprising:
    processing circuitry and storage media, wherein the processing circuitry has access to the storage media;
    a containerized application, stored in the storage media and executed by the processing circuitry;
    a virtual router, stored in the storage media and executed by the processing circuitry and configured to implement a data plane for a virtualized provider edge (PE) router, the virtualized PE router configured to provide a virtual private network (VPN) for the containerized application; and
    a containerized routing protocol process, stored in the storage media, executed by the processing circuitry and configured to implement a control plane for the virtualized PE router, the containerized routing protocol process configured to:
        obtain one of a Media Access Control (MAC) address or an Internet Protocol (IP) address of the containerized application;
        generate and output a route in accordance with a first routing protocol, the route comprising at least the one of the MAC address or the IP address, to implement the VPN for the containerized application; and
        program the virtual router with forwarding information for the route that causes the virtual router to forward a packet to the containerized application.

2. The computing device of claim 1, wherein the containerized routing protocol process is configured to establish a routing protocol peering session in accordance with the first routing protocol with a physical router that is external to the computing device.

3. The computing device of claim 1, wherein the containerized routing protocol process is configured to establish a routing protocol peering session in accordance with the first routing protocol with a different virtualized PE router that is external to the computing device.

4. The computing device of claim 1, wherein the VPN is an Ethernet VPN (EVPN) and the route comprises an EVPN Type-2 route or an EVPN Type-5 route.

5. The computing device of claim 1, wherein the VPN is a Layer 3 VPN (L3VPN) and the route is included in a Multi-Protocol Border Gateway Protocol (MP-BGP) message.

6. The computing device of claim 1, wherein the containerized routing protocol process is configured to:
    receive, from the containerized application, a routing protocol message in accordance with a second routing protocol, the routing protocol message indicating the IP address.

7. The computing device of claim 1,
    wherein the containerized routing protocol process is configured to operate in a host network mode to access a host network interface of the computing device, and
    wherein the containerized routing protocol process outputs the route via the host network interface.

8. The computing device of claim 1, further comprising:
    a virtual routing and forwarding instance (VRF) for the VPN, the VRF configured by the containerized routing protocol process,
    wherein the VRF is configured with an end of a virtual network interface.

9. The computing device of claim 1, further comprising:
a container networking interface (CNI) plugin executed by the processing circuitry and configured to:
configure, in the virtual router, a virtual network interface with a virtual network address for the containerized application; and
provide, to the containerized routing protocol process, an IP address for the virtual network interface.

10. The computing device of claim 9,
wherein the containerized routing protocol process is configured to establish, in accordance with a second routing protocol, a routing protocol peering session with the containerized application using the IP address for the virtual network interface.

11. The computing device of claim 1,
wherein the containerized routing protocol process is configured to establish, in accordance with a second routing protocol, a routing protocol peering session with the containerized application to receive the IP address sent via a virtual network interface.

12. A container orchestration system for a cluster of compute nodes including a compute node, the container orchestration system comprising:
processing circuitry and storage media, wherein the processing circuitry is configured to cause the container orchestration system to:
deploy a containerized application to the compute node; and
in response to deploying the containerized application to the compute node, configure, by communicating with or transmitting configuration data to be consumed by a containerized routing protocol process deployed to the compute node, the containerized routing protocol process with a virtual routing and forwarding (VRF) instance to generate a route to implement a virtual private network (VPN) for the containerized application and instruct the containerized routing protocol process to program a virtual router, deployed to the compute node and configured to implement a data plane for a virtualized provider edge (PE) router, with forwarding information for the route that causes the virtual router to forward a packet to the containerized application.

13. The container orchestration system of claim 12,
wherein a network attachment definition specification defines the VRF instance, and
wherein the container orchestration system is configured to configure the VRF instance in response to determining a specification for the containerized application references a network attachment definition in the network attachment definition specification.

14. The container orchestration system of claim 12, wherein the container orchestration system is configured to:
send the route with an Internet Protocol (IP) prefix to a container network interface (CNI) executing on the compute node to cause the CNI to program the containerized application with the IP prefix to indicate a network reachable via the containerized application, wherein a specification for the containerized application includes the IP prefix.

15. The container orchestration system of claim 12, wherein the container orchestration system is configured to:
send the route with a Media Access Control (MAC) address to a container network interface (CNI) executing on the compute node to cause the CNI to program the containerized application with the MAC address, wherein a specification for the containerized application includes the MAC address.

16. Non-transitory computer-readable media comprising instructions that, when executed by processing circuitry of a computing device, cause the computing device to:
execute a virtual router configured to implement a data plane for a virtualized provider edge (PE) router, the virtualized PE router configured to provide a virtual private network (VPN) for a containerized application; and
execute a containerized routing protocol process configured to implement a control plane for the virtualized PE router that:
obtains one of a Media Access Control (MAC) address or an Internet Protocol (IP) address of the containerized application,
executes a first routing protocol configured to generate and output a route comprising at least the one of the MAC address or the IP address to implement the VPN for the containerized application, and
programs the virtual router with forwarding information for the route that causes the virtual router to forward a packet to the containerized application.

17. The non-transitory computer-readable media of claim 16, wherein the containerized routing protocol process is configured to implement the control plane for the virtualized PE router that:
receives, from the containerized application, a routing protocol message in accordance with a second routing protocol, the routing protocol message indicating the IP address.

18. The non-transitory computer-readable media of claim 16,
wherein the containerized routing protocol process is configured to operate in a host network mode to access a host network interface of the computing device, and
wherein the containerized routing protocol process is configured to implement the control plane for the virtualized PE router that outputs the route via the host network interface.

19. The non-transitory computer-readable media of claim 16, wherein the containerized routing protocol process is configured to implement the control plane for the virtualized PE router with a virtual routing and forwarding instance (VRF), wherein the VRF is configured with an end of a virtual network interface.

20. The non-transitory computer-readable media of claim 16, where the instructions, when executed by processing circuitry of a computing device, cause the computing device to:
execute a container networking interface (CNI) plugin configured to:
configure, in the virtual router, a virtual network interface with a virtual network address for the containerized application; and
provide, to the containerized routing protocol process, an IP address for the virtual network interface.

* * * * *